United States Patent [19]

Kashizaki et al.

[11] Patent Number: 5,278,013
[45] Date of Patent: Jan. 11, 1994

[54] ELECTROPHOTOGRAPHIC PHOTOSENSITIVE MEMBER, AND ELECTROPHOTOGRAPHIC APPARATUS AND FACSIMILE MACHINE EMPLOYING THE SAME

[75] Inventors: Yoshio Kashizaki, Yokohama; Koichi Suzuki, Kawasaki, both of Japan

[73] Assignee: Canon Kabushiki Kaisha, Tokyo, Japan

[21] Appl. No.: 795,394

[22] Filed: Nov. 21, 1991

[30] Foreign Application Priority Data

Nov. 21, 1990 [JP] Japan .................. 2-314402
Jan. 25, 1991 [JP] Japan .................. 3-23780

[51] Int. Cl.$^5$ .............. G03G 15/02; G03G 5/00; G03G 15/06; H04N 1/21
[52] U.S. Cl. ...................... 430/58; 430/56; 430/59; 430/71; 430/72; 430/75; 355/211; 358/302
[58] Field of Search .............. 430/57, 72, 75, 71, 430/56, 58, 59, 78, 70, 73, 74; 355/211; 358/302

[56] References Cited

FOREIGN PATENT DOCUMENTS

| | | |
|---|---|---|
| 60-131539 | 7/1985 | Japan . |
| 1-149054 | 6/1989 | Japan .................. 430/57 |
| 1-312550 | 12/1989 | Japan . |
| 2-082259 | 3/1990 | Japan .................. 430/75 |
| 2176021 | 12/1986 | United Kingdom . |

OTHER PUBLICATIONS

Pat. Abstracts, Japan, vol. 14, No. 279 (P-1062) [4222] Jun. 15, 1990 of JPA 2-82259 published Mar. 22, 1990.

*Primary Examiner*—Marion E. McCamish
*Assistant Examiner*—Stephen Crossan
*Attorney, Agent, or Firm*—Fitzpatrick, Cella, Harper & Scinto

[57] ABSTRACT

There is disclosed an electrophotographic photosensitive member having a photosensitive layer containing a disazo pigment represented by the following general formula (1) or (2);

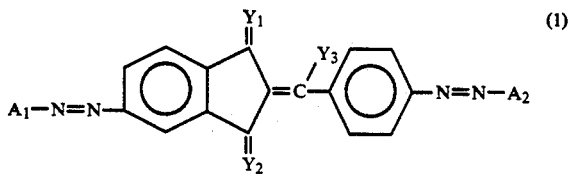

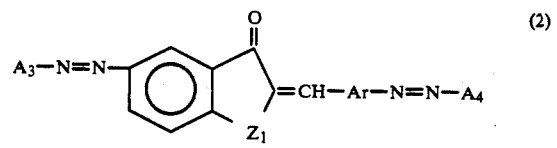

The photosensitive member has excellent durability and high sensitivity.

21 Claims, 1 Drawing Sheet

ELECTROPHOTOGRAPHIC PHOTOSENSITIVE MEMBER, AND ELECTROPHOTOGRAPHIC APPARATUS AND FACSIMILE MACHINE EMPLOYING THE SAME

BACKGROUND OF THE INVENTION

1. Field of the Invention

The present invention relates to an electrophotographic photosensitive member, more particularly to an electrophotographic photosensitive member comprising a photosensitive layer containing a disazo pigment having a specified chemical structure. The present invention also relates to an electrophotographic apparatus and a facsimile machine employing the photosensitive member

2. Related Background Art

Known organic photoconductive substances used for electrophotographic photosensitive members include photoconductive polymers typified by poly-N-vinylcarbazole, low-molecular organic photoconductive substances like 2,5-bis(p-diethylaminophenyl)-1,3,4-oxadiazole, and combinations of such an organic photoconductive substance with a dye or a pigment.

Electrophotographic photosensitive members employing an organic photoconductive substance have advantages that the photoconductive members are producible with extremely high productivity at a relatively low cost, and that the color sensitivity thereof is arbitrarily controlled by selecting the dye or the pigment to be used. Therefore, organic photoconductive substances have comprehensively been investigated. Recently, function-separation types of photosensitive members have been developed which have a lamination structure comprising a charge-generating layer containing an organic photoconductive dye or pigment and a charge-transporting layer containing aforementioned photoconductive polymer or a low-molecular organic electroconductive substance, whereby the disadvantage of conventional organic electrophotographic photosensitive members such as low sensitivity and low durability have been remarkably alleviated.

Among organic photoconductive substances, many azo dyes have superior photoconductivity generally. Moreover, selection of combinations of an azo component and a coupler component readily gives various properties of the compound. Accordingly, many compounds have been disclosed as organic photoconductive substances, for example, in Japanese Patent Application Laid-Open Nos. Sho-60-131539, Hei-1-312550, etc.

Recently, to meet the demand for higher picture quality and higher durability, electrophotographic photosensitive members are being investigated which have a higher sensitivity and better electrophotographic characteristics even during repeated use.

SUMMARY OF THE INVENTION

An object of the present invention is to provide an electrophotographic photosensitive member comprising a photosensitive layer containing a novel photoconductive material.

Another object of the present invention is to provide an electrophotographic photosensitive member having high sensitivity.

A still further object of the present invention is to provide an electrophotographic photosensitive member having excellent potential characteristics stably even when it is repeatedly used.

A further object of the present invention is to provide an electrophotographic apparatus and a facsimile machine employing the above-mentioned electrophotographic photosensitive member.

According to an aspect of the present invention, there is provided an electrophotographic photosensitive member comprising an electroconductive support and a photosensitive layer formed thereon, the photosensitive layer containing a disazo pigment represented by the general formula (1) or (2) below:

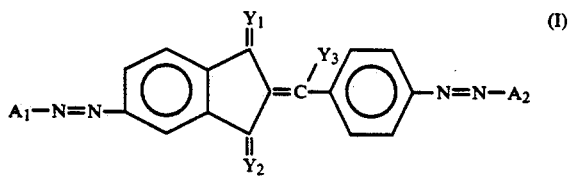

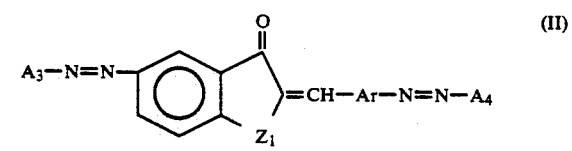

wherein $Y_1$ and $Y_2$ are independently an oxygen atom or a sulfur atom; $Y_3$ is a hydrogen atom, a substituted or unsubstituted alkyl group, or a cyano group; $Z_1$ is a group of methylene, sulfinyl, or sulfonyl; Ar is a substituted or unsubstituted arylene group or a substituted or unsubstituted bivalent heterocyclic group; $A_1$, $A_2$, $A_3$, and $A_4$ are independently a coupler residue having a phenolic hydroxyl group.

According to another aspect of the present invention, there is provided an electrophotographic apparatus employing the electrophotographic photosensitive member specified above.

According to still another aspect of the present invention, there is provided a facsimile machine employing the electrophotographic photosensitive member specified above.

DESCRIPTION OF THE PREFERRED EMBODIMENT

Figure 1:
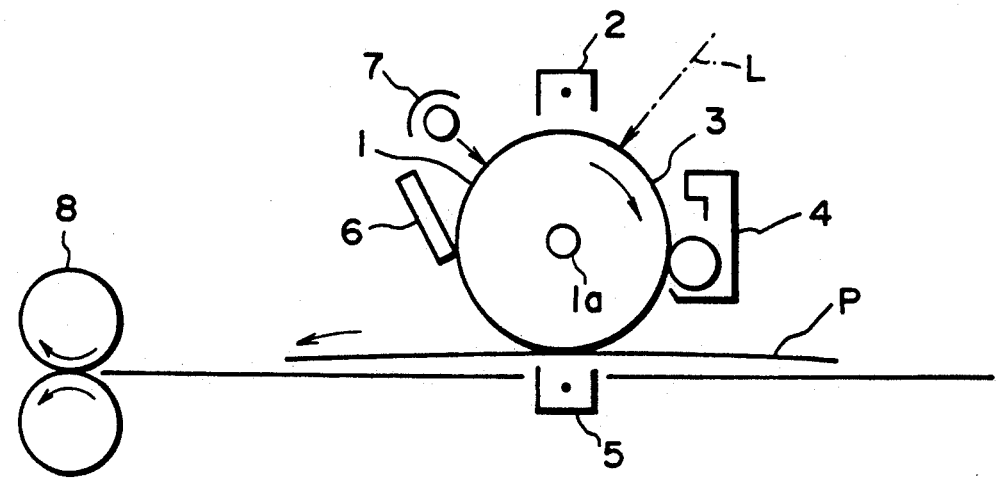
FIG. 1 illustrates outline of the constitution of an electrophotographic apparatus employing the electrophotographic photosensitive member of the present invention.

The photosensitive member of the present invention comprises an electrophotographic photosensitive layer containing a disazo pigment represented by the general formula (1) or (2) shown below.

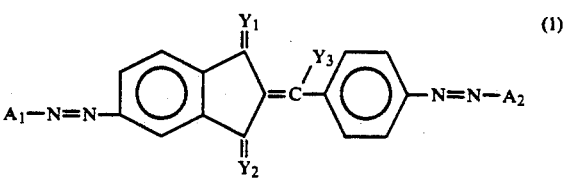

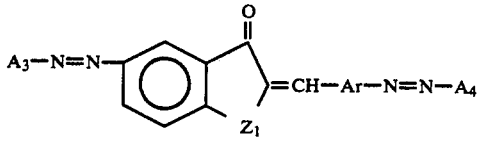  (2)

In the above formulas, $Y_1$ and $Y_2$ are independently an oxygen atom or a sulfur atom; $Y_3$ is a hydrogen atom, a substituted or unsubstituted alkyl group, or a cyano group. Specifically the alkyl group includes methyl, ethyl, propyl, butyl, and the like, and the substituent thereof includes halogeno, nitro, cyano, halomethyl, and the like.

$Z_1$ in the above formulas is a group of methylene, sulfinyl, or sulfonyl, and Ar in the above formulas is a substituted or unsubstituted arylene group or a substituted or unsubstituted bivalent heterocyclic group. Specifically, the arylene group includes o-phenylene, m-phenylene, p-phenylene, 1,4-naphthylene, 1,5-naphthylene, etc. and the bivalent heterocyclic group includes 2,4-pyridindiyl, 2,5-pyridindiyl, 2,6-pyridindiyl, etc. The substituent for these group includes alkyl group such as methyl; halogeno, halomethyl, etc.

$A_1$, $A_2$, $A_3$, and $A_4$ in the above formulas are independently a coupler residue having a phenolic hydroxyl group. Preferable examples are the groups represented by Formulas (3) to (8), but the coupler residue is not limited thereto.

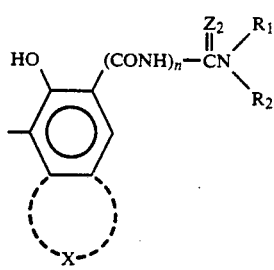  (3)

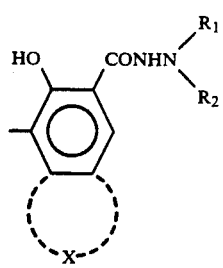  (4)

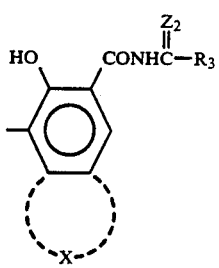  (5)

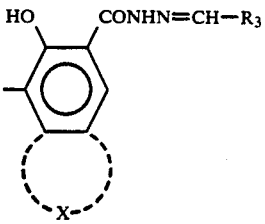  (6)

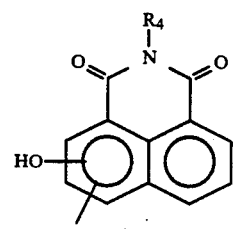  (7)

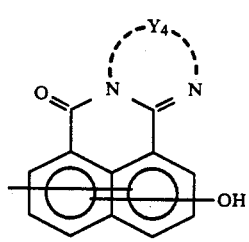  (8)

In Formulas (3), (4), (5), and (6), X is an atomic group which forms, by condensation with the benzene ring, a polycyclic aromatic or heterocyclic ring such as a substituted or unsubstituted naphthalene ring, a substituted or unsubstituted anthracene ring, a substituted or unsubstituted carbazole ring, a substituted or unsubstituted benzocarbazole ring, and a substituted or unsubstituted dibenzofuran ring.

In Formula (8), $Y_4$ is a substituted or unsubstituted bivalent aromatic hydrocarbon radical, or a substituted or unsubstituted bivalent heterocyclic radical having a nitrogen atom in the ring. Specific examples of the bivalent group are o-phenylene, o-naphthylene, peri-naphthylene, 1,2-anthracene, 3,4-pyrazoldiyl, 2,3-pyridindiyl, 4,5-pyridindiyl, 6,7-indazoldiyl, 6,7-quinolindiyl, etc.

In Formulas (3) and (4), $R_1$ and $R_2$ are respectively a hydrogen atom, a substituted or unsubstituted alkyl group, a substituted or unsubstituted aryl group, a substituted or unsubstituted aralkyl group, or a substituted or unsubstituted heterocyclic group, or $R_1$ and $R_2$ may be linked together to form a cyclic amine having a nitrogen atom in the ring.

In Formulas (5) and (6), $R_3$ is a hydrogen atom, a substituted or unsubstituted alkyl group, a substituted or unsubstituted aryl group, a substituted or unsubstituted aralkyl group, or a substituted or unsubstituted heterocyclic group.

In Formula (7), $R_4$ is a hydrogen atom, a substituted or unsubstituted alkyl, a substituted or unsubstituted aryl group, a substituted or unsubstituted aralkyl group, or a substituted or unsubstituted heterocyclic group.

In the above description, the alkyl group includes methyl, ethyl, propyl, etc.; the aryl group includes phenyl, naphthyl, anthryl, etc.; the aralkyl group includes benzyl, phenethyl, etc.; the heterocyclic group includes pyridyl, thienyl, carbazolyl, benzimidazolyl, benzothiazolyl, etc.; and the cyclic amino group containing a nitrogen in the ring includes the groups of pyrrole, pyrroline, pyrrolidine, pyrrolidone, indole, indoline, carbazole, imidazole, pyrazole, pyrazoline, oxazine, phenoxazine, etc.

The substituent of the above groups includes halogeno such as fluoro, chloro, iodo, and bromo; alkyl such as methyl, ethyl, and propyl; alkoxy such as methoxy, and ethoxy; alkylamino such as dimethylamino, and diethyl amino; phenylcarbamoyl; nitro; cyano; halomethyl such as trifluoromethyl, and the like.

In the Formula (3) and (4), $Z_2$ is an oxygen atom or a sulfur atom, and n is 0 or 1.

In the case where $A_1$ and $A_2$ of the disazo pigment of Formula (1) or $A_3$ and $A_4$ of the disazo pigment of Formula (2) are represented by the Formula (3), (4), (5), or (6), and X is an atomic group forming a benzocarbazole ring by condensation with the benzene ring, this disazo pigment has an broad absorption region extending to near infrared. Therefore, this pigment is particularly suitable for an electrophotographic sensitive member used in an electrophotographic apparatus employing a semiconductor laser as the exposure light source.

The present invention also relates to an electrophotographic apparatus using the above electrophotographic sensitive member of the present invention.

The present invention further relates to a facsimile machine having an information-receiving means for receiving image information from the electrophotographic apparatus and the remote terminal using the electrophotographic sensitive member of the present invention.

Preferred disazo pigments represented by Formula (1) or (2) are exemplified specifically below without limiting the invention thereto. In exemplifying the pigments, the basic structure is firstly shown, and subsequently only variable portions are shown for each pigment.

Exemplified Disazo Pigments represented by Formula (1)

Basic Structure:

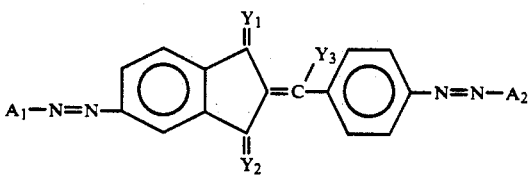

Exemplified pigment 1-(1)
  $Y_1$: =O
  $Y_2$: =O
  $Y_3$: —H

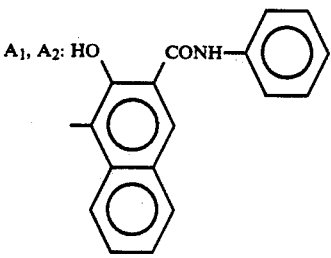

Exemplified pigment 1-(2)

$Y_1$: =O
$Y_2$: =O
$Y_3$: —H

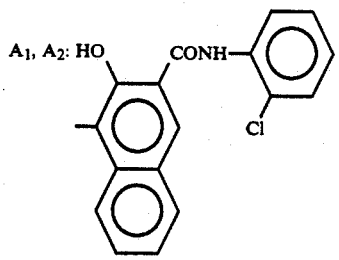

Exemplified pigment 1-(3)
  $Y_1$: =O
  $Y_2$: =O
  $Y_3$: —H

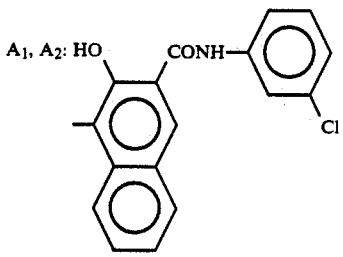

Exemplified pigment 1-(4)
  $Y_1$: =O
  $Y_2$: =O
  $Y_3$: —H

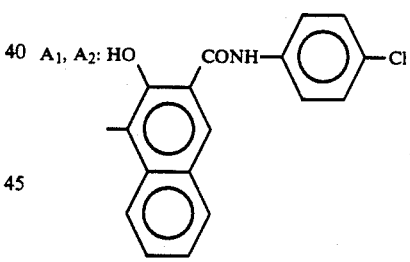

Exemplified pigment 1-(5)
  $Y_1$: =O
  $Y_2$: =O
  $Y_3$: —H

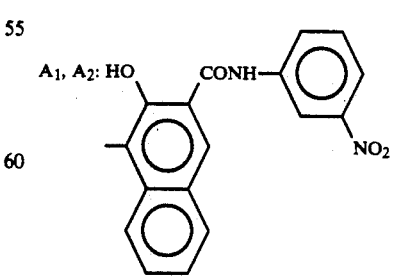

Exemplified pigment 1-(6)
  $Y_1$: =O
  $Y_2$: =O

Y₃: —CN
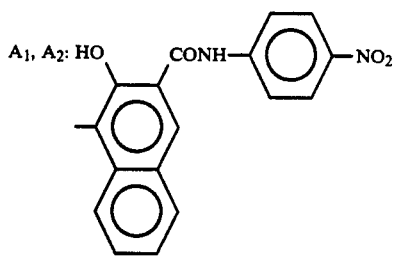
Exemplified pigment 1-(7)
    Y₁: =S
    Y₂: =S
    Y₃: —H
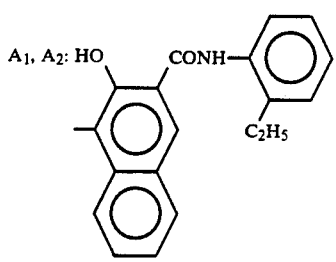
Exemplified pigment 1-(8)
    Y₁: =O
    Y₂: =O
    Y₃: —H
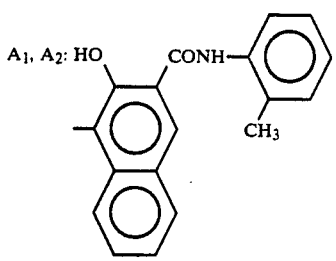
Exemplified pigment 1-(9)
    Y₁: =O
    Y₂: =O
    Y₃: —H
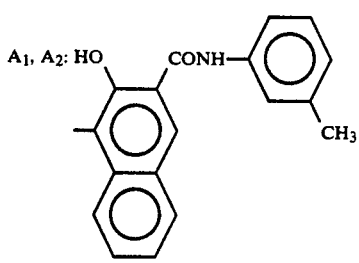
Exemplified pigment 1-(10)
    Y₁: =O
    Y₂: =O
    Y₃: —H
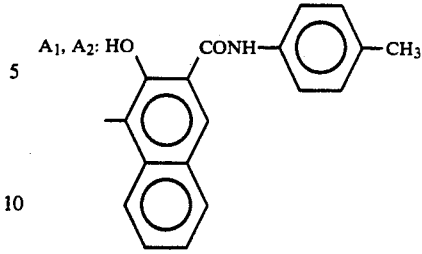
Exemplified pigment 1-(11)
    Y₁: =O
    Y₂: =O
    Y₃: —CH₃
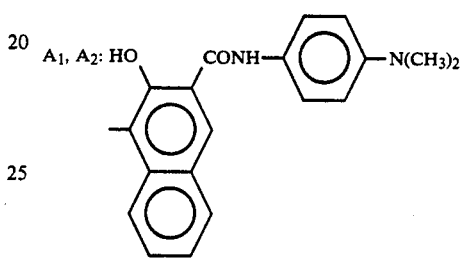
Exemplified pigment 1-(12)
    Y₁: =O
    Y₂: =O
    Y₃: —H
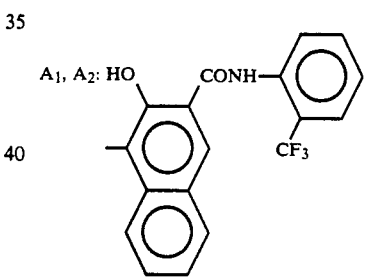
Exemplified pigment 1-(13)
    Y₁: =O
    Y₂: =O
    Y₃: —CH₂Cl
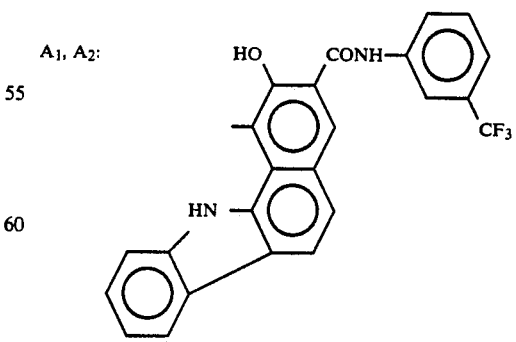
Exemplified pigment 1-(14)
    Y₁: =O
    Y₂: =O Y₃: —C₂H₅
A₁, A₂:
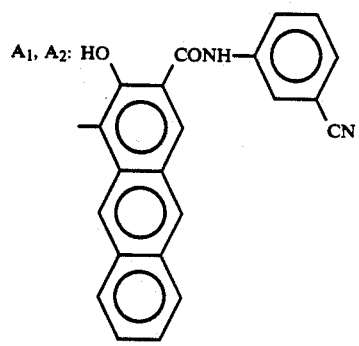
Exemplified pigment 1-(15)
  Y₁: =O
  Y₂: =O
  Y₃: —H
A₁, A₂:
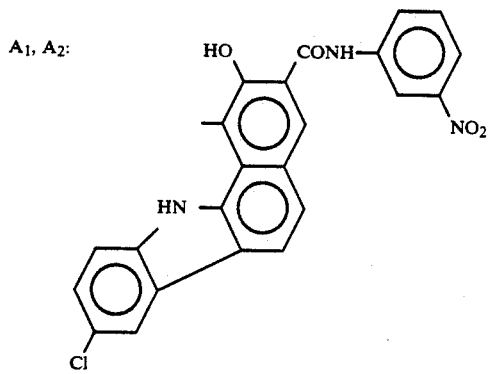
Exemplified pigment 1-(16)
  Y₁: =O
  Y₂: =O
  Y₃: —H
A₁, A₂:
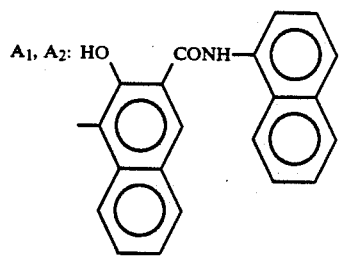
Exemplified pigment 1-(17)
  Y₁: =O
  Y₂: =O
  Y₃: —H
A₁, A₂:
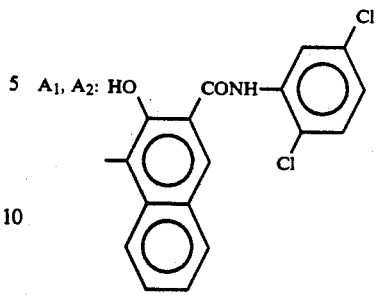
Exemplified pigment 1-(18)
  Y₁: =O
  Y₂: =O
  Y₃: —H
A₁, A₂:
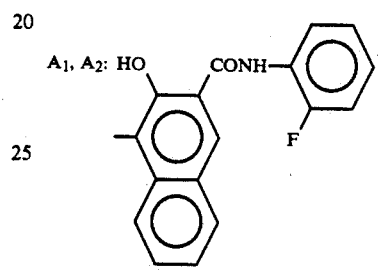
Exemplified pigment 1-(19)
  Y₁: =S
  Y₂: =O
  Y₃: —H
A₁, A₂:
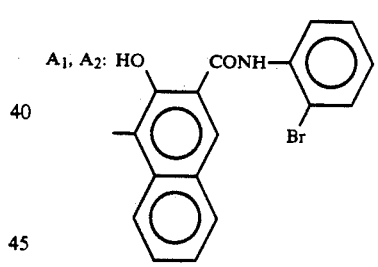
Exemplified pigment 1-(20)
  Y₁: =O
  Y₂: =O
  Y₃: —H
A₁, A₂:
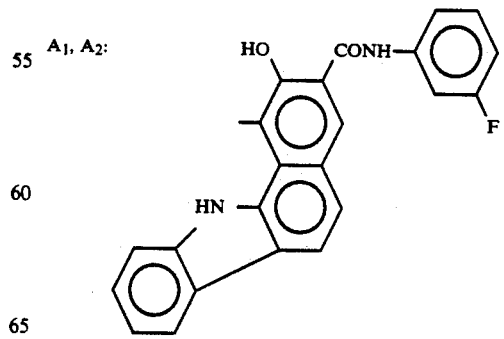
Exemplified pigment 1-(21)
  Y₁: =O $Y_2$: =O
$Y_3$: —H
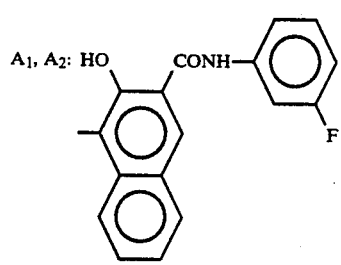
Exemplified pigment 1-(22)
$Y_1$: =O
$Y_2$: =O
$Y_3$: —H
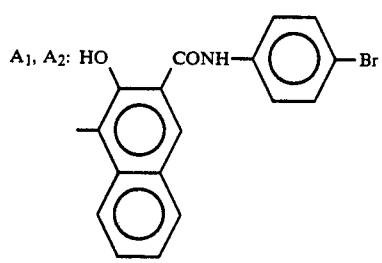
Exemplified pigment 1-(23)
$Y_1$: =O
$Y_2$: =O
$Y_3$: —H
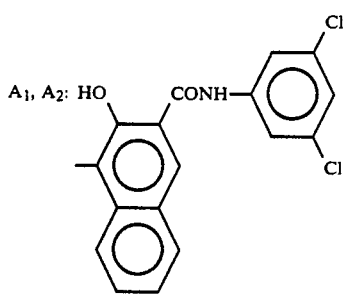
Exemplified pigment 1-(24)
$Y_1$: =O
$Y_2$: =O
$Y_3$: —H
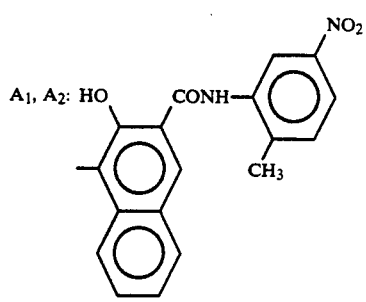
Exemplified pigment 1-(25)
$Y_1$: =O
$Y_2$: =S
$Y_3$: —H
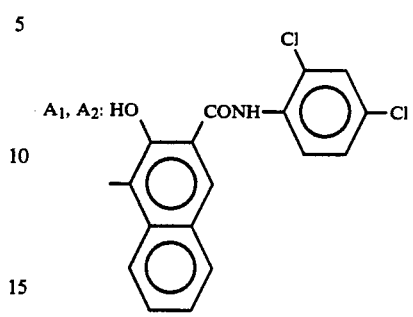
Exemplified pigment 1-(26)
$Y_1$: =O
$Y_2$: =O
$Y_3$: —H
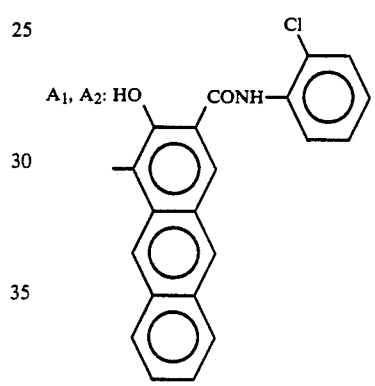
Exemplified pigment 1-(27)
$Y_1$: =O
$Y_2$: =O
$Y_3$: —H
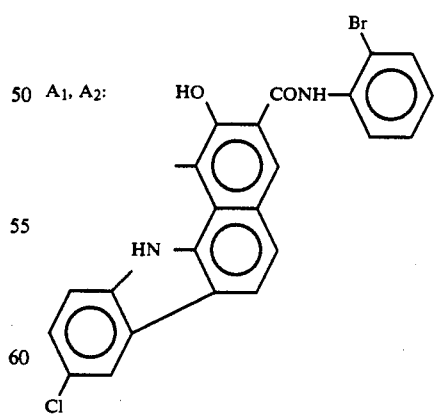
Exemplified pigment 1-(28)
$Y_1$: =O
$Y_2$: =O
$Y_3$: —H

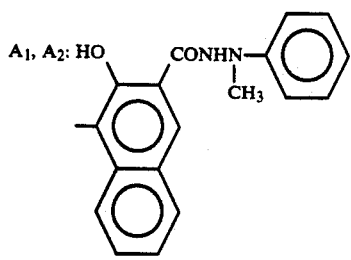
Exemplified pigment 1-(29)
 $Y_1$: =O
 $Y_2$: =O
 $Y_3$: —H
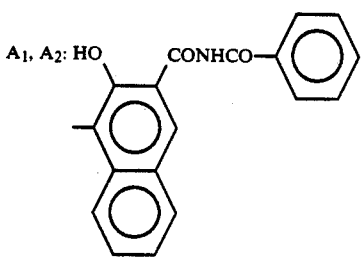
Exemplified pigment 1-(30)
 $Y_1$: =O
 $Y_2$: =O
 $Y_3$: —H
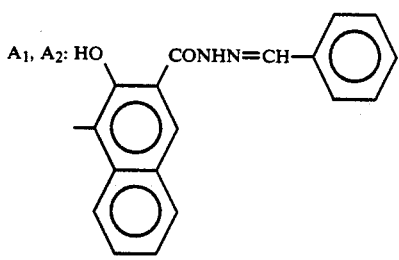
Exemplified pigment 1-(31)
 $Y_1$: =O
 $Y_2$: =O
 $Y_3$: —H
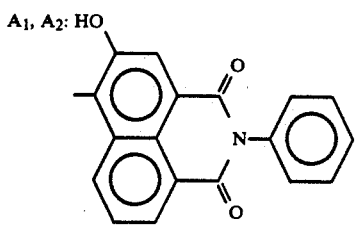
Exemplified pigment 1-(32)
 $Y_1$: =O
 $Y_2$: =O
 $Y_3$: —H
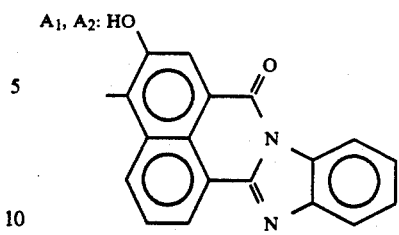
Exemplified pigment 1-(33)
 $Y_1$: =O
 $Y_2$: =O
 $Y_3$: —H
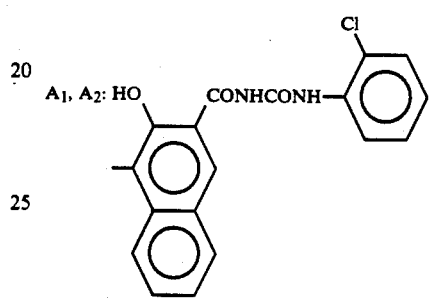
Exemplified pigment 1-(34)
 $Y_1$: =O
 $Y_2$: =O
 $Y_3$: —H
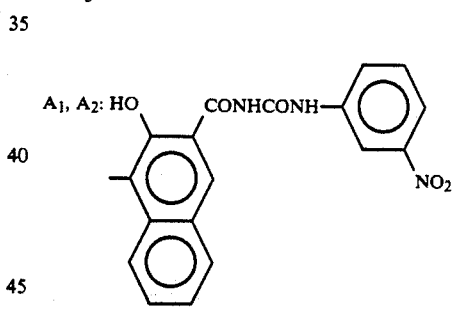
Exemplified pigment 1-(35)
 $Y_1$: =O
 $Y_2$: =O
 $Y_3$: —H
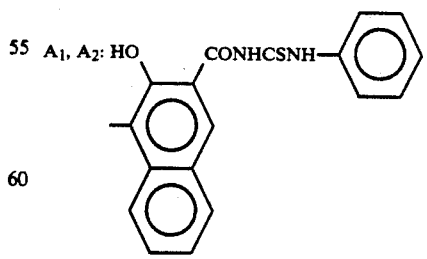
Exemplified pigment 1-(36)
 $Y_1$: =O
 $Y_2$: =O
 $Y_3$: —H

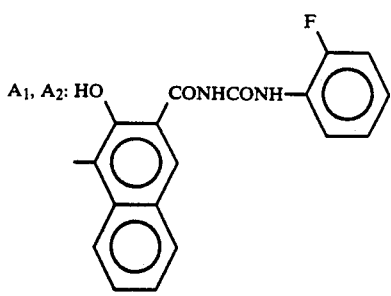
Exemplified pigment 1-(37)
 $Y_1$: =O
 $Y_2$: =O
 $Y_3$: —H
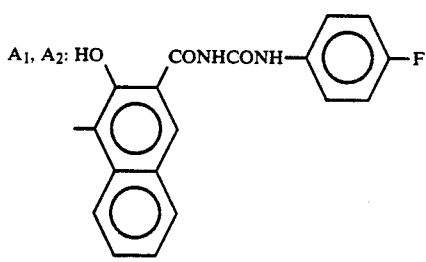
Exemplified pigment 1-(38)
 $Y_1$: =O
 $Y_2$: =O
 $Y_3$: —H
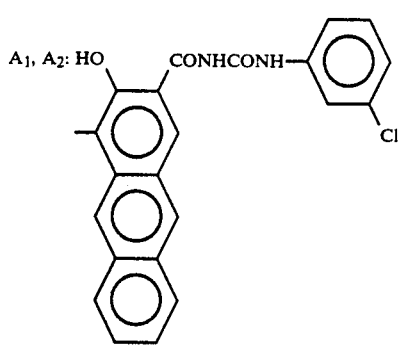
Exemplified pigment 1-(39)
 $Y_1$: =O
 $Y_2$: =O
 $Y_3$: —H
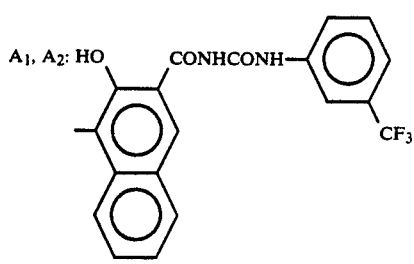
Exemplified pigment 1-(40)
 $Y_1$: =O
 $Y_2$: =O
 $Y_3$: —H
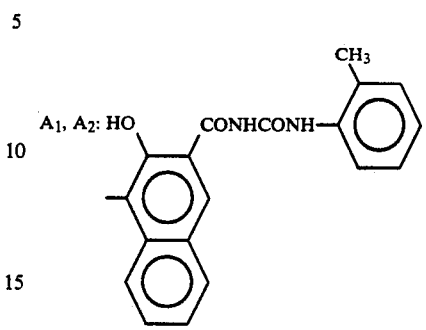
Exemplified pigment 1-(41)
 $Y_1$: =O
 $Y_2$: =O
 $Y_3$: —H
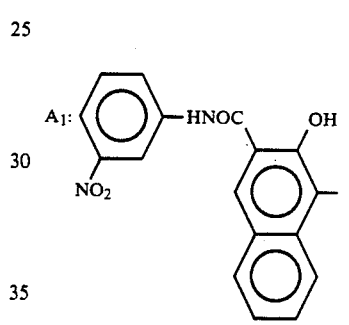
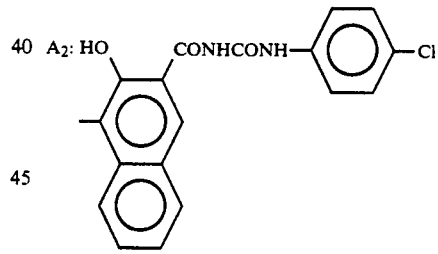
Exemplified pigment 1-(42)
 $Y_1$: =O
 $Y_2$: =O
 $Y_3$: —H
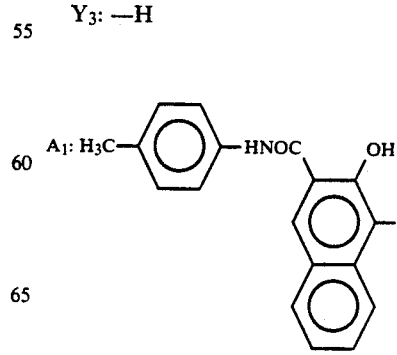

-continued
A$_2$: 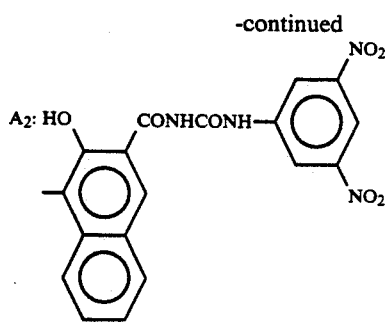
Exemplified Disazo Pigments represented by Formula (2)
Basic Structure:
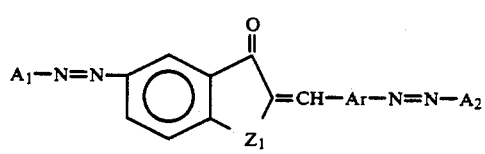
Exemplified pigment 2-(1)
$Z_1$: —CH$_2$—  Ar: 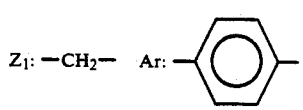
$A_1$ and $A_2$: HO 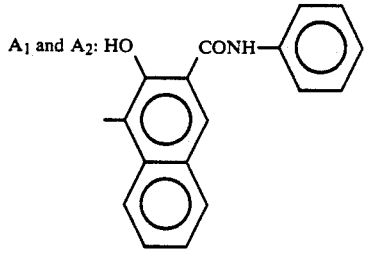
Exemplified pigment 2-(2)
$Z_1$: —CH$_2$—  Ar: 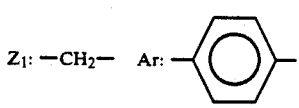
$A_1$ and $A_2$: HO 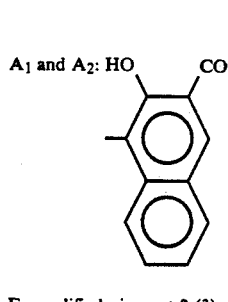
Exemplified pigment 2-(3)
$Z_1$: —CH$_2$—  Ar: 
-continued
$A_1$ and $A_2$: HO 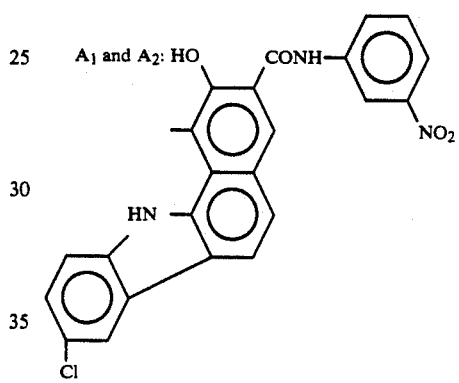
Exemplified pigment 2-(4)
$Z_1$: —CH$_2$—  Ar: 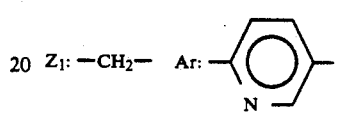
$A_1$ and $A_2$: HO 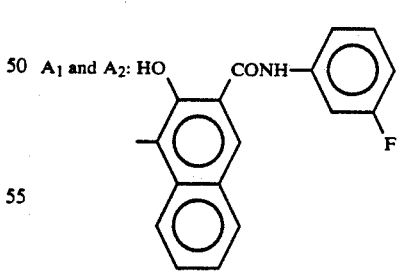
Exemplified pigment 2-(5)
$Z_1$: —CH$_2$—  Ar: 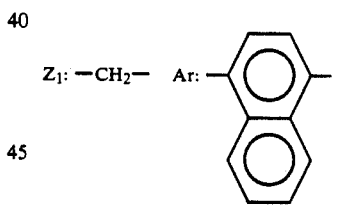
$A_1$ and $A_2$: HO 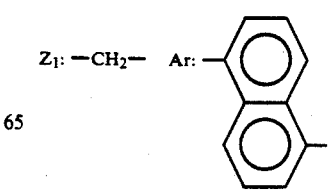
Exemplified pigment 2-(6)
$Z_1$: —CH$_2$—  Ar: 

-continued
A₁ and A₂: 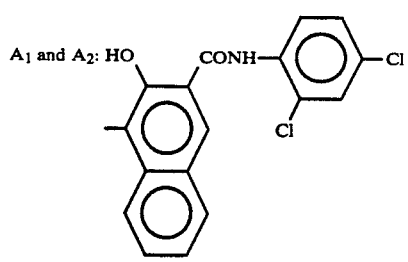
Exemplified pigment 2-(7)
Z₁: —CH₂— Ar: 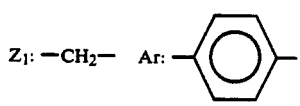
A₁ and A₂: 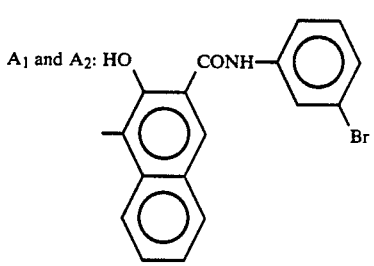
Exemplified pigment 2-(8)
Z₁: —CH₂— Ar: 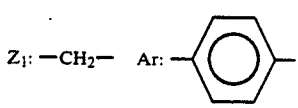
A₁ and A₂: 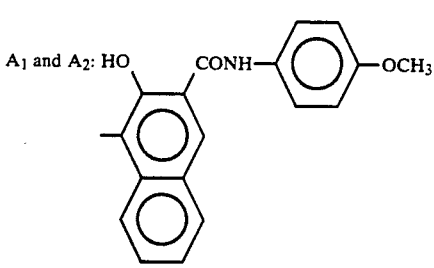
Exemplified pigment 2-(9)
Z₁: —CH₂— Ar: 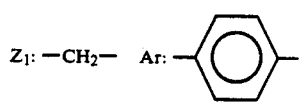
A₁ and A₂: 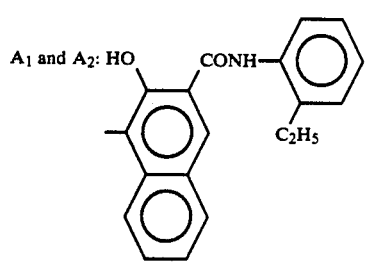
Exemplified pigment 2-(10)
-continued
Z₁: —CH₂— Ar: 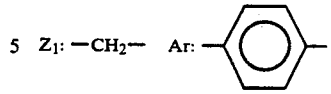
A₁ and A₂: 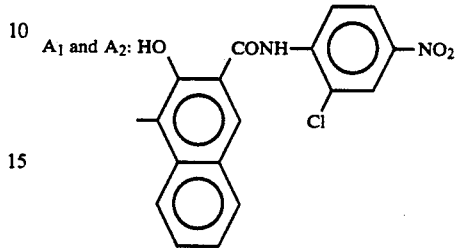
Exemplified pigment 2-(11)
Z₁: —CH₂— Ar: 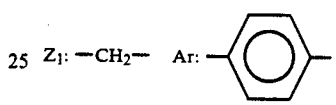
A₁ and A₂: 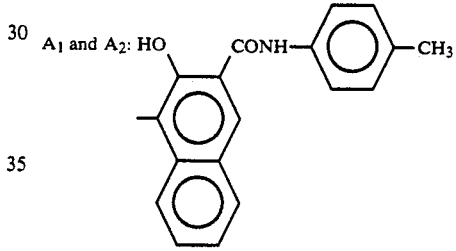
Exemplified pigment 2-(12)
Z₁: —CH₂— Ar: 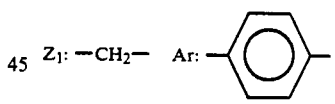
A₁ and A₂: 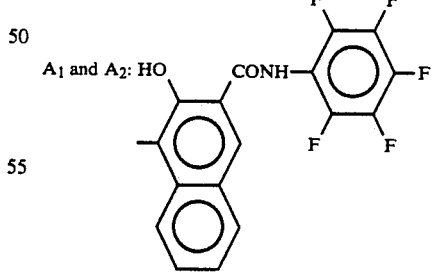
Exemplified pigment 2-(13)
Z₁: —CH₂— Ar: 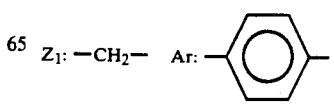

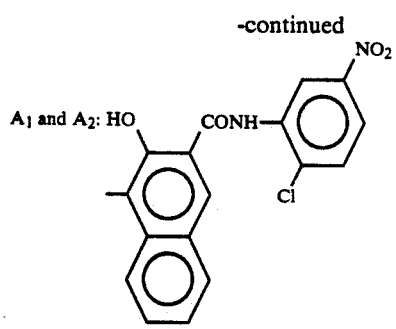
Exemplified pigment 2-(14)
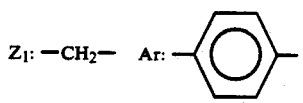
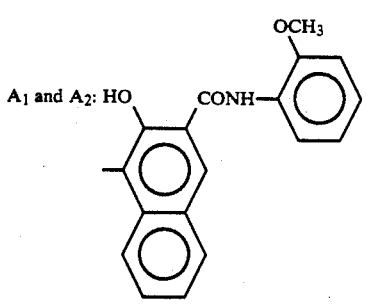
Exemplified pigment 2-(15)
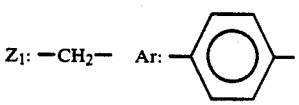
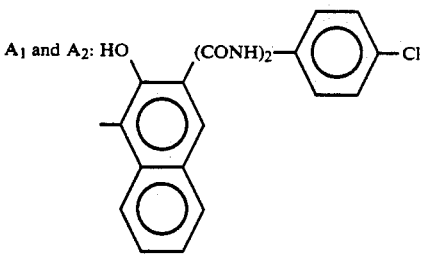
Exemplified pigment 2-(16)
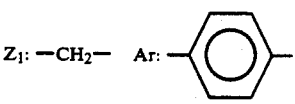
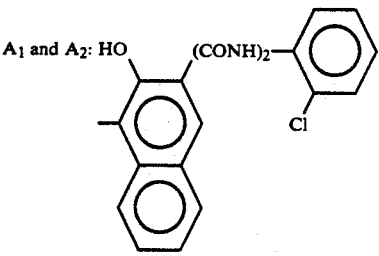
Exemplified pigment 2-(17)
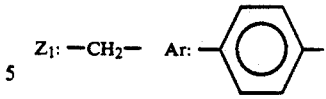
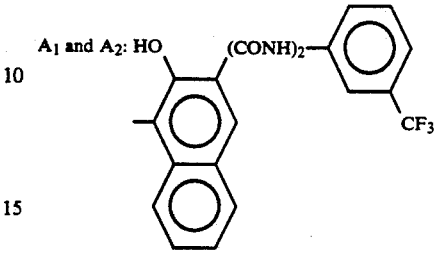
Exemplified pigment 2-(18)
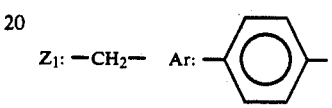
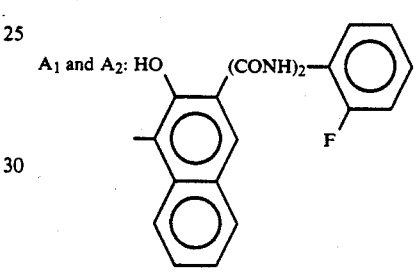
Exemplified pigment 2-(19)
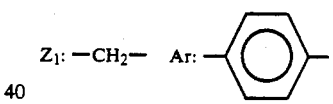
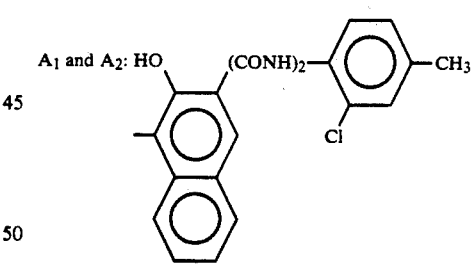
Exemplified pigment 2-(20)
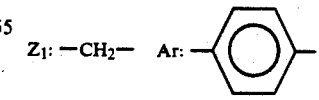
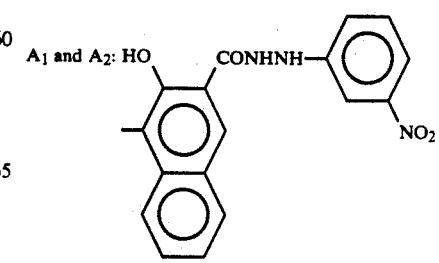

Exemplified pigment 2-(21)
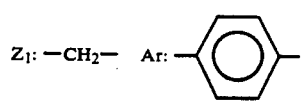
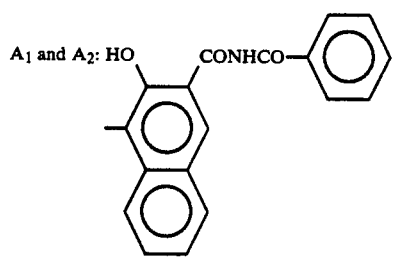
Exemplified pigment 2-(22)
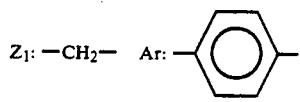
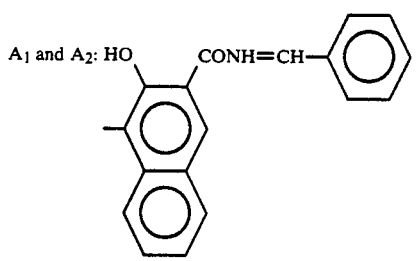
Exemplified pigment 2-(23)
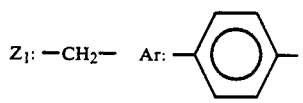
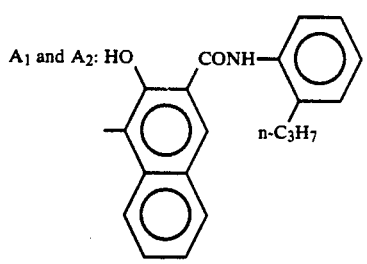
Exemplified pigment 2-(24)
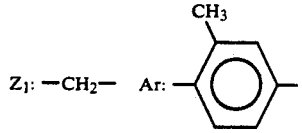
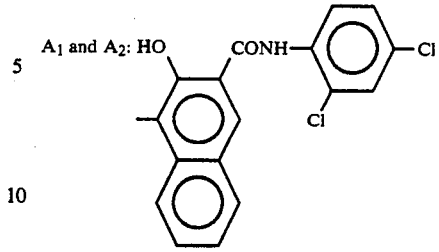
Exemplified pigment 2-(25)
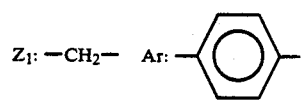
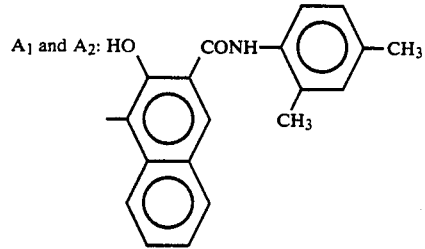
Exemplified pigment 2-(26)
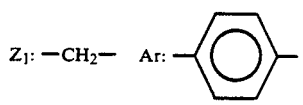
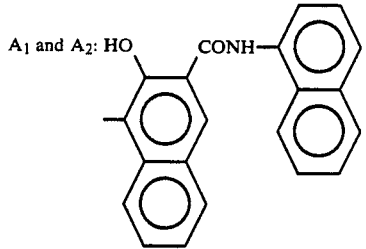
Exemplified pigment 2-(27)
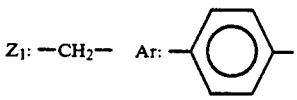
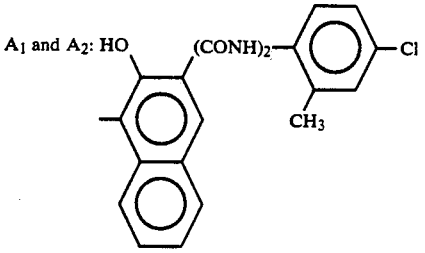
Exemplified pigment 2-(28)

$Z_1$: —$CH_2$— Ar: 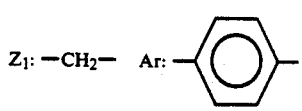
$A_1$: 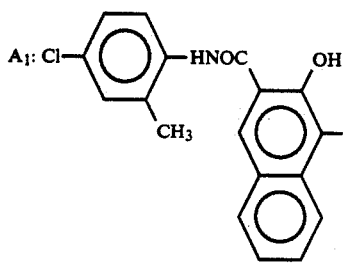
$A_2$: 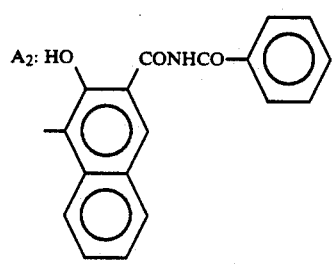
Exemplified pigment 2-(29)
$Z_1$: —SO— Ar: 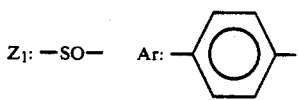
$A_1$: 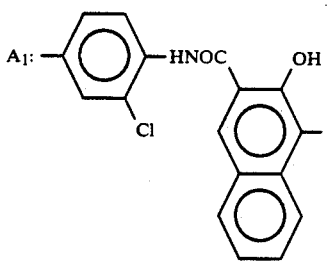
$A_2$: 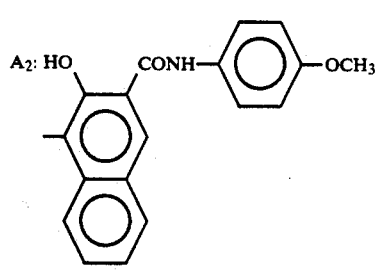
Exemplified pigment 2-(30)
$Z_1$: —$SO_2$— Ar: 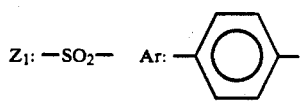
$A_1$: 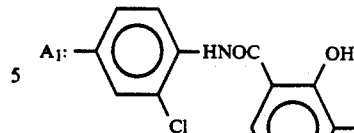
$A_2$: 
Exemplified pigment 2-(31)
$Z_1$: —$CH_2$— Ar: 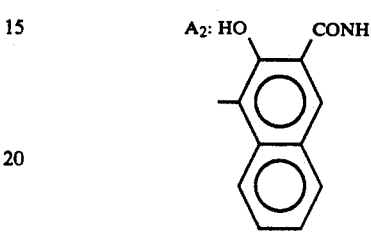
$A_1$: 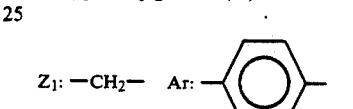
$A_2$: 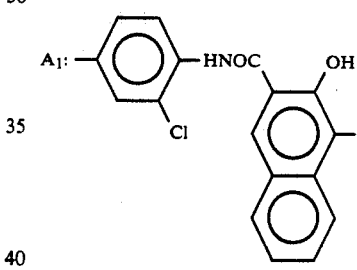
Exemplified pigment 2-(32)
$Z_1$: —$CH_2$— Ar: 
$A_1$ and $A_2$: HO 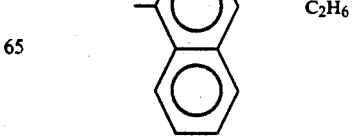

Exemplified pigment 2-(33)
$Z_1$: —CH$_2$— Ar:
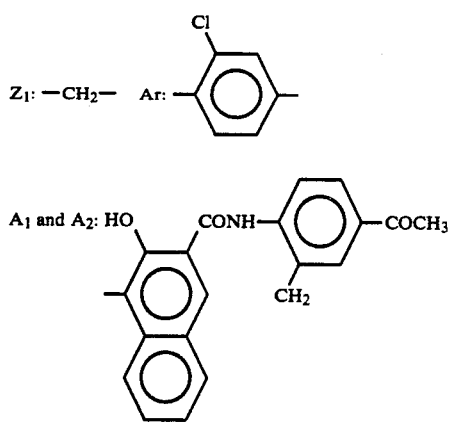
$A_1$ and $A_2$: 
Exemplified pigment 2-(34)
$Z_1$: —CH$_2$— Ar:
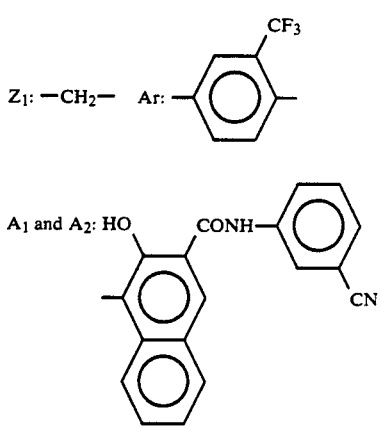
$A_1$ and $A_2$:
Exemplified pigment 2-(35)
$Z_1$: —CH$_2$— Ar:
$A_1$:
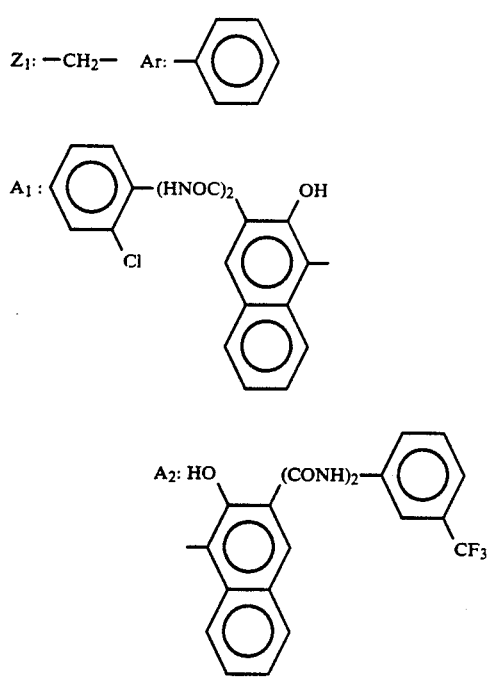
$A_2$:
Exemplified pigment 2-(36)
$Z_1$: —CH$_2$— Ar:
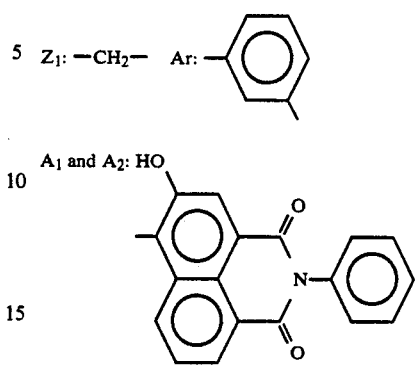
$A_1$ and $A_2$:
Exemplified pigment 2-(37)
$Z_1$: —CH$_2$— Ar:
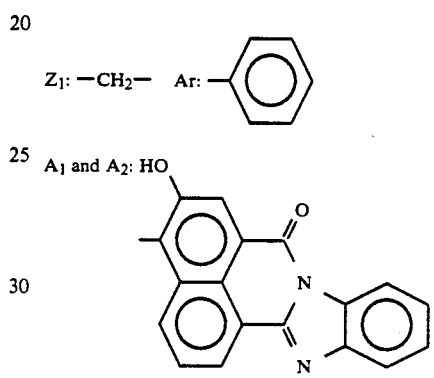
$A_1$ and $A_2$:
Exemplified pigment 2-(38)
$Z_1$: —CH$_2$— Ar:
$A_1$:
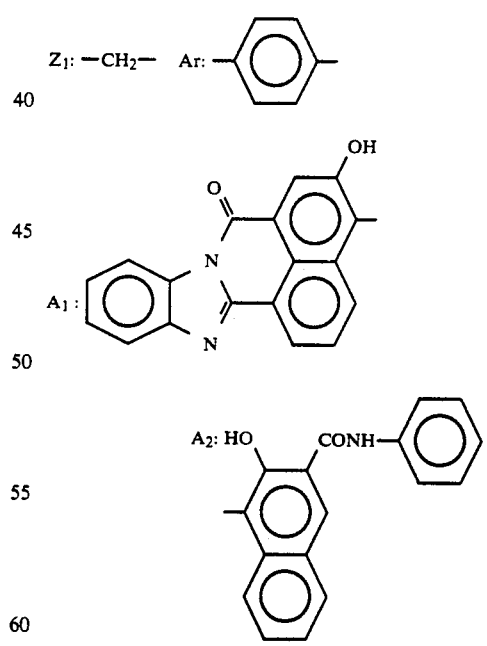
$A_2$:
Exemplified pigment 2-(39)
$Z_1$: —CH$_2$— Ar: 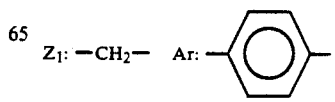

-continued

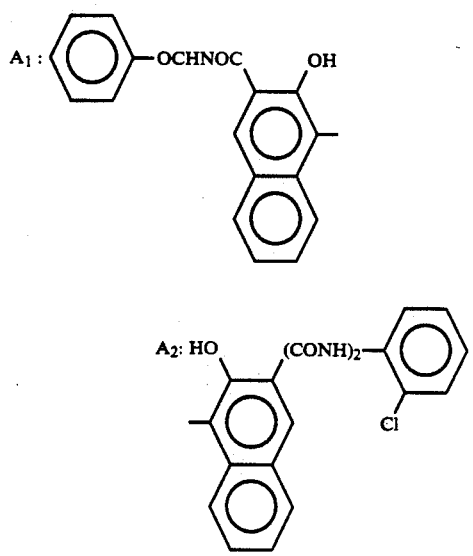

Exemplified pigment 2-(40)

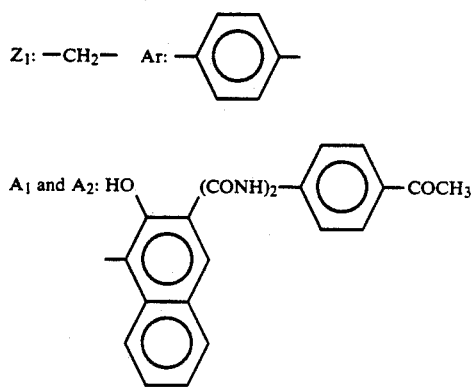

Exemplified pigment 2-(41)

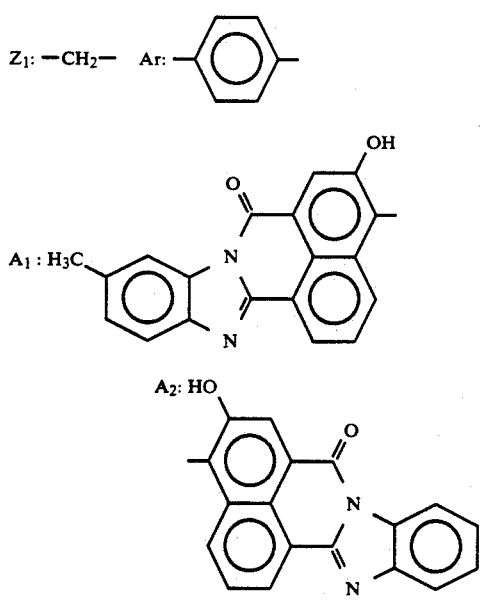

Exemplified pigment 2-(42)

-continued

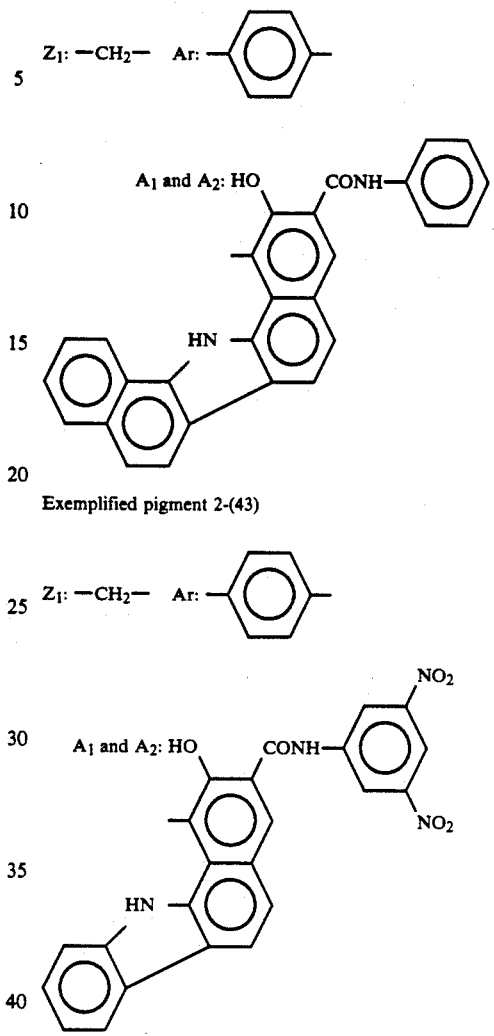

Exemplified pigment 2-(43)

A general method for synthesis of the compound represented by Formula (1) or Formula (2) is described below without limiting the synthesis method thereto.

In the case where $A_1$ and $A_2$ in Formula (1) or $A_3$ and $A_4$ in Formula (2) are identical with each other, a diamine corresponding to the compound is converted to a tetrazonium salt by use of sodium nitrite or nitrosylsulfuric acid according to a conventional method. Then the resulting tetrazonium salt is (a) coupled with a coupler having the structure of $A_1$ or $A_3$ in an aqueous solution in the presence of alkali, or (b) converted into a form of a stable salt such as a borofluoride salt or a zinc chloride double salt, and subsequently coupled with a coupler in an organic solvent such as dimethylformamide (DMF) and dimethylsulfoxide in the presence of a base such as sodium acetate, triethylamine, and N-methylmorpholine. Thereby the compound of Formula (1) or Formula (2) is readily synthesized.

In the case where $A_1$ is different from $A_2$ or where $A_3$ is different from $A_4$, (a) the tetrazonium salt is coupled with an equimolar amount of a first coupler to prepare a monoazo compound and then coupled with an equimolar amount of a second coupler to give the disazo pigment, or alternatively (b) the tetrazonium salt is coupled with a mixture of the two kinds of couplers. (c) In order to produce effectively a pigment having different $A_1$ and $A_2$ in Formula (1) or $A_3$ and $A_4$ in Formula (2) within the molecule, preferably one of the amino groups of the diamine is protected by an acetyl group or the like and then the other amino group is diazotized and coupled with one coupler, and subsequently the protected group is hydrolyzed by hydrochloric acid or the like, and diazotized again and coupled with the other coupler to give the intended pigment.

A synthesis example of the compound employed in the present invention is shown specifically below.

SYNTHESIS EXAMPLE 1

Synthesis of Exemplified compound 1-(1)

150 ml of water, 20 ml (0.23 mol) of concentrated hydrochloric acid, and 8.0 g (0.032 mol) of the diamine of the formula below were placed in 300-ml beaker.

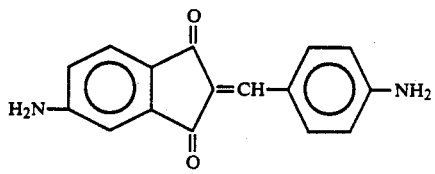

The mixture was cooled to 0° C., and thereto a solution of 4.6 g (0.067 mol) of sodium nitrite in 10 ml of water was added dropwise over 10 minutes at the liquid temperature of 5° C. or below. After stirring the liquid for 15 minutes, the liquid was filtered with carbon. To the filtrate, a solution of 10.5 g (0.096 mol) of sodium borofluoride in 90 ml of water was added dropwise with stirring. The deposited borofluoride salt was collected by filtration, washed with cold water and then with acetonitrile, and dried at room temperature under reduced pressure. The yield was 10.2 g (yield rate: 71.1%)

Separately, 500 ml of DMF was placed in a 1-liter beaker. Therein 11.1 g (0.042 mol) of Naphtol AS was dissolved and the solution was cooled to a temperature of 5° C. Thereto, 9.8 g (0.020 mol) of the borofluoride salt obtained above was dissolved, and 5.1 g (0.050 mol) of triethylamine was added dropwise in 5 minutes. The liquid was stirred for 2 hours. The deposited pigment was collected by filtration, washed four times with DMF and three times with water, and freeze-dried. The yield was 15.2 g (yield rate: 95%). The result of elemental analysis of the obtained diazo pigment was as below.

|   | Calculated (%) | Found (%) |
|---|---|---|
| C | 75.17 | 75.52 |
| H | 4.29 | 4.10 |
| N | 10.52 | 10.39 |

SYNTHESIS EXAMPLE 2

Synthesis of Exemplified Compound 2-(1)

150 ml of water, 20 ml (0.23 mol) of concentrated hydrochloric acid, and 8.5 g (0.032 mol) of 6-amino-2(4'-aminobenzylidene)-1-indanone were placed in 300-ml beaker. The mixture was stirred at room temperature for 30 minutes, and cooled to 0° C. Thereto a solution of 4.6 g (0.067 mol) of sodium nitrite in 10 ml of water was added dropwise in 10 minutes at the liquid temperature of 2° C. or below. After stirring the liquid for 15 minutes, the liquid was filtered with carbon. To the filtrate, a solution of 10.5 g (0.096 mol) of sodium borofluoride in 90 ml of water was added dropwise with stirring. The deposited borofluoride salt was collected by filtration, washed with cold water and then with acetonitrile, and dried at room temperature under reduced pressure. The yield was 10.7 g (yield rate: 76%)

Separately, 500 ml of DMF was placed in a 1-liter beaker. Therein 11.1 g (0.042 mol) of Naphtol AS was dissolved and the solution was cooled to a temperature of 5° C. Thereto, 9.0 g (0.020 mol) of the borofluoride salt obtained above was dissolved, and 5.1 g (0.050 mol) of N-methylmorpholine was added dropwise over 1 minute. The liquid was stirred for 2 hours. The deposited pigment was collected by filtration, washed four times with DMF and three times with water, and freeze-dried. The yield was 18.2 g (yield rate: 88%). The result of elemental analysis of the obtained diazo pigment was as below.

|   | Calculated (%) | Found (%) |
|---|---|---|
| C | 73.88 | 73.98 |
| H | 3.97 | 4.20 |
| N | 10.34 | 10.70 |

In the present invention, the photosensitive layer, which contains the compound represented by Formula (1) or Formula (2), includes those of the layer constructions below. The constructions are shown with the layer order of (lower layer)/(upper layer).

(1) A layer containing a charge-generating substance (charge-generating layer)/a layer containing a charge-transporting substance (charge-transporting layer), (2) A charge-transporting layer/a charge-generating layer, and (3) A layer containing a charge-generating substance and a charge-transporting substance.

Naturally, the construction of the photosensitive layer of the present invention is not limited to those mentioned above. Among the above constructions, the construction (1) is particularly preferred.

The photosensitive layer is described below in detail.

The charge-generating layer may be formed by applying, onto an electroconductive support, a coating liquid which has been prepared by dispersing the azo pigment of Formula (1) or Formula (2) and a binder in a suitable solvent. The film thickness is preferably not more than 5 μm, more preferably in the range of from 0.1 to 1 μm.

The binder resin used may be selected from a variety of insulating resins and organic photoconductive polymers. Preferred resins are polyvinylbutyrals, polyvinylbenzals, polyarylates, polycarbonates, polyesters, phenoxy resins, cellulose resins, acrylic resins, polyurethanes, and the like. The content of the binder resin in the charge-generating layer is preferably not more than 80% by weight, more preferably not more than 40% by weight.

Any solvent may be employed, provided that the solvent is capable of dissolving the above-mentioned resin. Specific examples of the solvents include ethers such as tetrahydrofuran and 1,4-dioxane; ketones such as cyclohexanone and methyl ethyl ketone; amides such as N,N-dimethylformamide; esters such as methyl acetate and ethyl acetate; aromatic solvents such as toluene, xylene and chlorobenzene; alcohols such as methanol, ethanol and 2-propanol; aliphatic halogenated hydrocarbons such as chloroform, methylene chloride, dichloroethylene, carbon tetrachloride and trichloroethylene; and the like. The solvents are preferable which dissolve neither the charge-transporting layer nor the subbing layer described later.

The azo pigment employed in the present invention may either be amorphous or be crystalline. Two or more of the azo pigments of Formulas (1) and (2) may be combinedly used or the azo pigment may be used combinedly with a known charge-generating substance, if necessary.

The charge-transporting layer may be formed inside or outside the charge-generating layer in lamination, and functions to receive charge carriers from the charge-generating layer and to transport the carriers under an electric field applied.

The charge-transporting layer may be formed by applying a solution of a charge-transporting substance and optionally a suitable binder resin in a solvent. The layer thickness is preferably in the range of from 5 to 40 $\mu$m, more preferably from 15 to 30 $\mu$m.

The charge-transporting substance includes electron-transporting substances and positive-hole-transporting substances. The examples of the electron-transporting substances are electron-attracting substances such as 2,4,7-trinitrofluorenone, 2,4,5,7-tetranitrofluorenone, chloranil, and tetracyanoquinodimethane; and polymers of such electron-attracting substances.

The positive-hole-transporting substances include polycyclic aromatic compounds such as pyrene and anthracene; heterocyclic compounds including carbazoles, indoles, imidazoles, oxazoles, thiazoles, oxadiazoles, pyrazoles, pyrazolines, thiadiazoles, and triazoles; hydrazone compounds such as p-diethylaminobenzaldehyde-N,N-diphenylhydrazone, and N,N-diphenylhydrazino-3-methylidene-9-ethylcarbazole; styryl compounds such as α-phenyl-4'-N,N-diphenylaminostilbene, and 5-[4-(di-p-tolylamino)benzylidene]-5H-dibenzo[a,d]cycloheptene; benzidine compounds; triarylmethane compounds; triphenylamine compounds; and the like; and polymers having a radical derived from the above compound in the main chain or the side chain thereof such as poly-N-vinylcarbazole, polyvinylanthracene, etc.

In addition to those organic charge-transporting substances, inorganic materials such as selenium, selenium-tellurium, amorphous silicon, and cadmium sulfide may also be used.

Two or more of these charge-transporting substances may be combined.

If the charge-transporting substance does not have a film-forming property, a suitable binder may be used. The specific examples of the binder include insulating resins such as acrylic resins, polyarylates, polyesters, polycarbonates, polystyrenes, acrylonitrile-styrene copolymers, polyacrylamides, polyamides, chlorinated rubbers, and the like; and organic photoconductive polymers such as poly-N-vinylcarbazole, polyvinylanthracene, and the like.

Other specific examples of the present invention are electrophotographic photosensitive members having a single layer type of photosensitive layer which contains the azo pigment of Formula (1) or Formula (2) and a charge-transporting substance in one and the same layer. In such examples, a charge-transfer complex not mentioned above such as a combination of poly-N-vinylcarbazole and trinitrofluorenone may also be used as the charge-transporting substance.

The thickness of the photosensitive layer of a single layer type is preferably in the range of from 5 to 40 $\mu$m, more preferably from 10 to 30 $\mu$m.

In the present invention, a resin layer or a resin layer containing electroconductive particles or charge-transporting substance as a protective layer may be provided for the purpose of protecting the photosensitive layer from adverse mechanical and chemical influences of the environment, in the present invention.

A subbing layer having the functions of a barrier and an adhesive may be provided between the electroconductive support and the photosensitive layer. The subbing layer may be made of casein, polyvinyl alcohol, nitrocellulose, polyamide (such as nylon 6, nylon 66, nylon 610, a nylon copolymer, and alkoxymethylated nylon), polyurethane, aluminum oxide, and the like. The thickness of the subbing layer is preferably not more than 5 $\mu$m, more particularly in the range of from 0.1 to 3 $\mu$m.

The respective layers can be formed by using a suitable organic solvent according to a coating method such as dip coating, spray coating, beam coating, roller coating, Meyer bar coating, and blade coating.

The electroconductive support may be made of such a material like aluminum, aluminum alloy, copper, zinc, stainless steel, vanadium, molybdenum, chromium, titanium, nickel, indium, gold, and platinum. Further, the electroconductive support may be a plastic on which a film of the metal or metal alloy as mentioned above is formed by vacuum vapor deposition (the plastic including polyethylene, polypropylene, polyvinyl chloride, polyethylene terephthalate, acrylic resins, and the like); or may be a plastic or metal substrate which is coated with a mixture of electroconductive particles (such as carbon black particles, and silver particles) and a suitable binder; or alternatively may be a plastic or paper sheet impregnated with electroconductive particles.

The electroconductive support may be in a shape of a drum, a sheet, a belt, or the like, and is preferably formed in the most suitable shape for the electrophotographic apparatus to be employed.

The electrophotographic photosensitive member of the present invention is not only useful for electrophotographic copying machines but also useful for a variety of application fields of electrophotography including facsimile machines, laser beam printers, CRT printers, LED printers, liquid crystal printers, laser engraving systems, and so forth.

FIG. 1 shows a schematic diagram of a transfer type electrophotographic apparatus employing the electrophotographic photosensitive member of the present invention.

In FIG. 1, a drum type photosensitive member 1 serves as an image carrier, being driven to rotate around the axis 1a in the arrow direction at a predetermined peripheral speed. The photosensitive member 1 is uniformly charged positively or negatively at the peripheral surface during the rotation by an electrostatic charging means 2, and then exposed to image-exposure light L (e.g. slit exposure, laser beam-scanning exposure, etc.) at the exposure portion 3 with an image-exposure means (not shown in the figure), whereby electrostatic latent images are sequentially formed on the peripheral surface in accordance with the exposed image.

The electrostatic latent image is developed with a toner by a developing means 4, and the toner-developed images are sequentially transferred by a transfer means 5 onto a surface of a transfer-receiving material P which is fed between the photosensitive member 1 and the transfer means 5 synchronously with the rotation of the photosensitive member 1 from a transfer-receiving material feeder not shown in the figure.

The transfer-receiving material P having received the transferred image is separated from the photosensitive member surface, and introduced to an image fixing means 8 for fixation of the image and sent out from the copying machine as a duplicate copy.

The surface of the photosensitive member 1, after the image transfer, is cleaned with a cleaning means 6 to remove any remaining non transferred toner, and is treated for charge-elimination with a pre-exposure means 7 for repeated use for image formation.

As the uniformly charging means 2 for the photosensitive member 1, a corona charging apparatus is usually widely used. As the transfer means 5, a corona charging means is also usually used widely. In the electrophotographic apparatus, two or more of the constitutional elements of the above described photosensitive member, the developing means, the cleaning means, etc. may be integrated into one apparatus unit, which may be made demountable from the main body of the apparatus. For example, at least one of an electrostatic charging means, a developing means, and a cleaning means is combined with the photosensitive member into one unit demountable from the main body of the apparatus by aid of a guiding means such as a rail of the main body of the apparatus. An electrostatic charging means and/or a developing means may be combined with the aforementioned apparatus unit.

In the case where the electrophotographic apparatus is used as a copying machine or a printer, the optical image exposure light L is projected onto the photosensitive member as reflected light or transmitted light from an original copy, or alternatively the signalized information is read out by a sensor from an original copy and then scanning with a laser beam, driving an LED array, or driving a liquid crystal shutter array according to the signal, and the exposure light is projected onto a photosensitive member.

Figure 2:
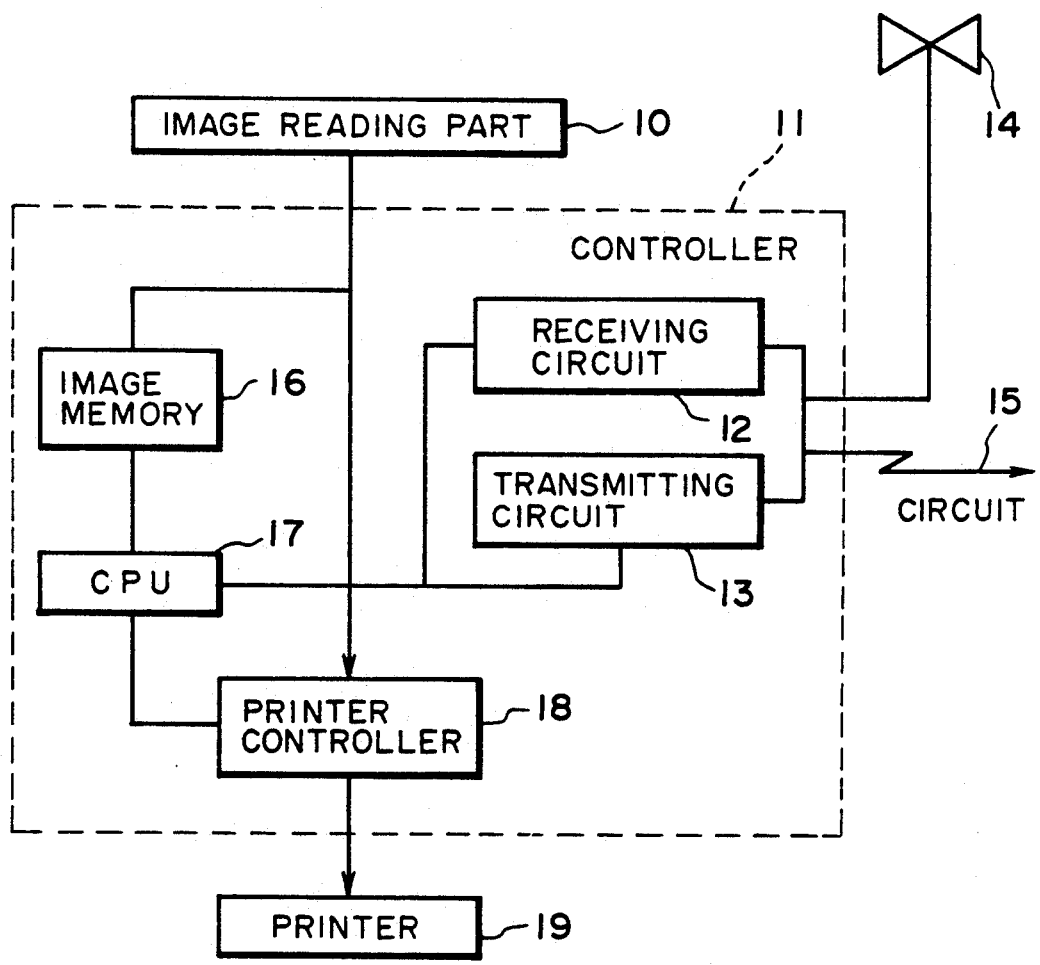
FIG. 2 illustrates an example of a block diagram of a facsimile employing the electrophotographic photosensitive member of the present invention.

In the case where the electrophotographic apparatus is used as a printer of a facsimile machine, the optical image exposure light L is for printing the received data. FIG. 2 is a block diagram of an example of this case.

A controller 11 controls an image reading part 10 and a printer 19. The whole of the controller 11 is controlled by a CPU 17. Readout data from the image reading part is transmitted through a transmitting circuit 13 to the other communication station. Data received from the other communication station is transmitted through a receiving circuit 12 to a printer 19. The image data is stored in image memory. A printer controller 18 controls a printer 19. The numeral 14 denotes a telephone set.

The image received through a circuit 15, namely image information from a remote terminal connected through the circuit, is demodulated by the receiving circuit 12, treated to decode the image information in CPU 17, and successively stored in the image memory 16. When at least one page of image information has been stored in the image memory 16, the images are recorded in such a manner that the CPU 17 reads out the one page of image information, and sends out the decoded one page of information to the printer controller 18, which controls the printer 19 on receiving the one page of information from CPU 17 to record the image information.

Incidentally the CPU 17 receives the following page of information while recording is conducted by the printer 19.

Images are received and recorded in the manner as described above.

The present invention is described in more detail by reference to examples.

EXAMPLE 1

Onto an aluminum substrate, a solution of 5 g of methoxymethylated nylon (weight-average molecular weight: 32,000) and 10 g of alcohol-soluble nylon copolymer (weight-average molecular weight: 29,000) in 95 g of methanol was applied with a Meyer bar to form a subbing layer of 1 μm in dry thickness.

Separately, 5 g of Exemplified pigment 1-(1) was added to a solution of 2 g of a butyral resin (butyralation degree: 63 mol %) in 95 g of cyclohexanone, and was dispersed for 20 hours by means of a sand mill. The resulting dispersion was applied and dried on the subbing layer having been formed as above with a Meyer bar to give a charge-generating layer of 0.1 μm in dry thickness.

Subsequently, 5 g of the hydrazone compound represented by the formula below:

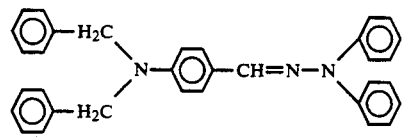

and 5 g of polymethyl methacrylate resin (weight-average molecular weight: 100,000) were dissolved in 40 g of chlorobenzene. The solution was applied onto the above-mentioned charge-generating layer with a Meyer bar and dried to form a charge-transporting layer of 22 μm in dry thickness.

The electrophotographic photosensitive member prepared thus was tested for charging characteristics by means of an electrostatic copying-paper tester (Model SP-428, made by Kawaguchi Denki K. K.) by subjecting the member to corona charge at −5 KV to be negatively charged, leaving it in the dark for 1 second, and exposing it to light of illuminance of 10 lux by use of a halogen lamp.

The charging characteristics measured were the surface potential ($V_O$) immediately after the charging, and the quantity of light exposure ($E_{\frac{1}{2}}$) required for decay of the surface potential by half after 1 second of dark standing, namely sensitivity.

The results are shown in Table 1.

EXAMPLES 2-25

Electrophotographic photosensitive members were prepared and evaluated in the same manner as in Example 1 except that Exemplified pigments shown in Table 1 were respectively used in place of Exemplified pigment 1-(1), and the dried thicknesses of the charge-generating layer and the charge-transporting layer in Examples 11-25 were made respectively to be 0.3 μm and 19 μm.

The results are shown in Table 1.

TABLE 1

| Example No. | Exemplified pigment | $V_0$ (−V) | $E_{\frac{1}{2}}$ (lux·sec) |
|---|---|---|---|
| 1 | 1-(1) | 700 | 1.7 |
| 2 | 1-(2) | 700 | 1.5 |
| 3 | 1-(5) | 700 | 1.3 |
| 4 | 1-(7) | 705 | 2.0 |
| 5 | 1-(22) | 702 | 1.8 |
| 6 | 1-(25) | 700 | 2.0 |
| 7 | 1-(29) | 695 | 1.7 |
| 8 | 1-(33) | 694 | 1.1 |
| 9 | 1-(39) | 690 | 3.0 |
| 10 | 1-(41) | 702 | 2.0 |
| 11 | 2-(1) | 700 | 2.32 |
| 12 | 2-(2) | 700 | 1.80 |
| 13 | 2-(6) | 700 | 1.75 |
| 14 | 2-(10) | 705 | 2.10 |
| 15 | 2-(13) | 705 | 2.11 |
| 16 | 2-(15) | 705 | 1.30 |
| 17 | 2-(16) | 700 | 1.00 |
| 18 | 2-(17) | 705 | 1.32 |
| 19 | 2-(18) | 700 | 1.10 |
| 20 | 2-(27) | 695 | 1.21 |
| 21 | 2-(35) | 695 | 1.45 |
| 22 | 2-(37) | 695 | 1.05 |
| 23 | 2-(38) | 690 | 1.23 |
| 24 | 2-(42) | 700 | 1.05 |
| 25 | 2-(43) | 700 | 1.08 |

COMPARATIVE EXAMPLES 1 and 2

Electrophotographic photosensitive members were prepared and evaluated for charging characteristics in the same manner as in Example 1 except that Comparative pigments (A) or (B) represented by the structural formulas below were used respectively in place of Exemplified pigment 1-(1).

The results are shown in Table 2.

Comparative pigment (A):

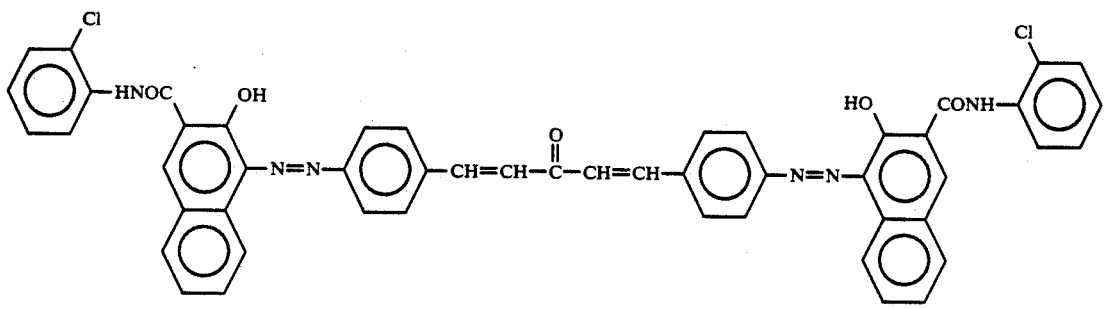

Comparative pigment (B):

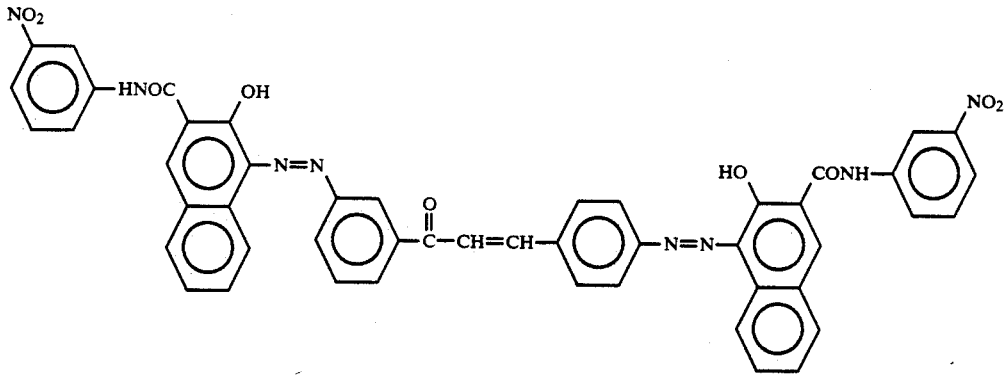

COMPARATIVE EXAMPLES 3 and 4

Electrophotographic photosensitive members were prepared and evaluated for charging characteristics in the same manner as in Example 11 except that Comparative pigments (C) or (D) represented by the structural formulas below were used respectively in place of Exemplified pigment 2-(1).

The results are shown in Table 2.

Comparative pigment (C):

-continued

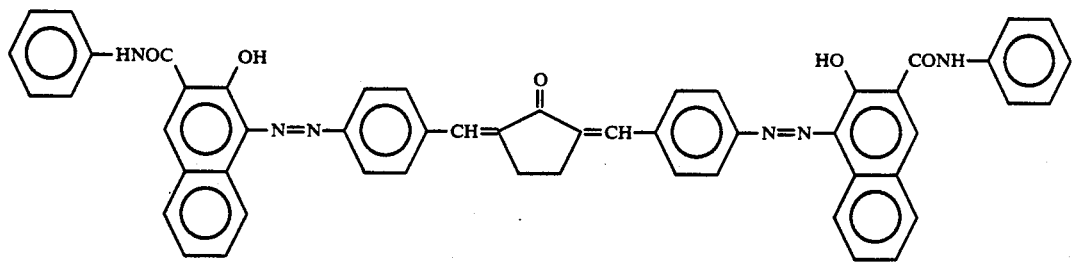

Comparative pigment (D):

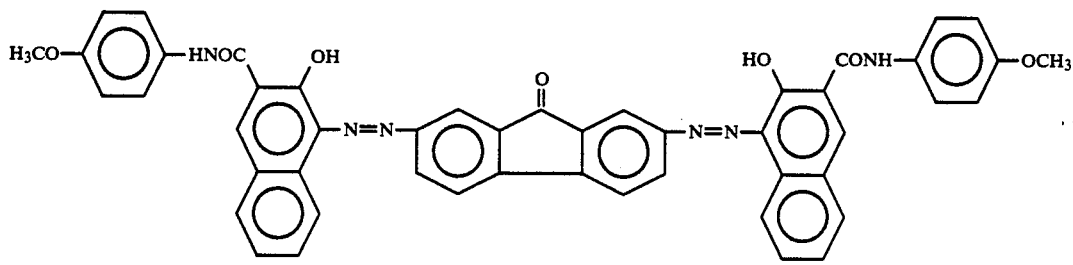

TABLE 2

| Comparative example No. | Comparative pigment | $V_0$ (−V) | $E_{\frac{1}{2}}$ (lux · sec) |
|---|---|---|---|
| 1 | (A) | 620 | 8.9 |
| 2 | (B) | 650 | 5.0 |
| 3 | (C) | 650 | 3.50 |
| 4 | (D) | 690 | 6.39 |

EXAMPLES 26-35

The electrophotographic photosensitive members prepared in Examples 1, 2, 5, 6, 12, 14, 17, 18, and 19 were respectively attached onto a cylinder of an electrophotographic copying machine equipped with a −6.5 KV corona charger, a light-exposing system, a developer, a transfer-charger, a destaticizing light-exposing system, and a cleaner.

With this copying machine, the dark portion potentials ($V_D$) and light portion potential ($V_L$) at the initial stage were set respectively at approximately −700 V and −200 V, and the changes of the dark-portion potentials ($\Delta V_D$) and of the light-portion potentials ($\Delta V_L$) caused by 5000 times of copying were measured to evaluate the durability characteristics.

The results are shown in Table 3, where the negative value of the change denotes the decrease of the absolute value of the potential and the positive value of the change denotes the increase of the absolute value of the potential.

TABLE 3

| Example No. | Exemplified pigment | $\Delta V_D$ (V) | $\Delta V_L$ (V) |
|---|---|---|---|
| 26 | 1-(1) | −10 | +5 |
| 27 | 1-(2) | −10 | 0 |
| 29 | 1-(22) | −15 | +3 |
| 30 | 1-(25) | −5 | 0 |
| 31 | 2-(2) | 0 | +5 |
| 32 | 2-(10) | −5 | 0 |
| 33 | 2-(16) | −5 | +5 |
| 34 | 2-(17) | −5 | +5 |
| 35 | 2-(18) | 0 | 0 |

COMPARATIVE EXAMPLES 5 and 7

The electrophotographic photosensitive members prepared in Comparative examples 1, 3, and 4 were evaluated for durability characteristics by measuring the potential change in repeated use in the same manner as in Example 26. The results are shown in Table 4.

TABLE 4

| Comparative example No. | Comparative pigment | $\Delta V_D$ (V) | $\Delta V_L$ (V) |
|---|---|---|---|
| 5 | (A) | −50 | +47 |
| 6 | (B) | −80 | +35 |
| 7 | (C) | −20 | +50 |

EXAMPLE 36

On an aluminum surface of an aluminum-vapor-deposited polyethylene terephthalate film, a subbing layer of polyvinyl alcohol (weight-average molecular weight: 80,000) of 0.4 µm thick was formed. Thereon, the dispersion of the disazo pigment employed in Example 5 was applied with a Meyer bar, and the applied layer was dried to give a charge-generating layer of 0.3 µm thick.

Subsequently, a solution of 5 g of the styryl compound of the formula below:

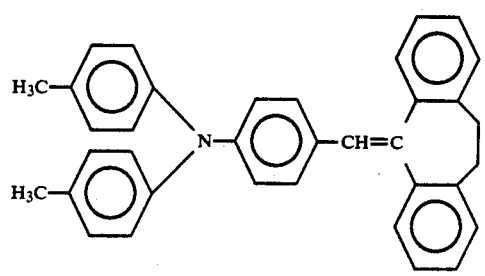

and 5 g of a polycarbonate resin (weight-average molecular weight: 55,000) in 40 g of tetrahydrofuran was applied on the charge-generating layer, and was dried to form a charge-transporting layer of 18 μm thick.

The electrophotographic photosensitive member prepared thus was tested for the charging properties and durability characteristics in the same manners as in Example 1 and Example 26. The results are shown in Table 5.

EXAMPLE 37

An electrophotographic photosensitive member was prepared in the same manner as in Example 36 except that the disazo pigment dispersion of Example 17 was used in place of the one of Example 5. In this Example, the thicknesses of the subbing layer, the charge-generating layer, and the charge-transporting layer were respectively made to be 0.7 μm, 0.2 μm, and 20 μm. The resulting electrophotographic photosensitive member was evaluated in the same manner as in Example 36. The test results are shown in Table 5.

TABLE 5

| Example No. | Exemplified pigment | $V_0$ (−V) | $E_{\frac{1}{2}}$ (lux · sec) | $\Delta V_D$ (V) | $\Delta V_L$ (V) |
|---|---|---|---|---|---|
| 36 | 1-(22) | 700 | 2.0 | −5 | 0 |
| 37 | 2-(16) | 700 | 1.23 | 0 | +5 |

EXAMPLE 38 and 39

Electrophotographic photosensitive members were prepared respectively in the same manner as in Example 1 or Example 37 except that the charge-generating layer and the charge-transporting layer were formed in the reversed order. The resulting electrophotographic photosensitive member was evaluated for charging characteristics in the same manner as in Example 1 but employing a positive charge potential. The results are shown in Table 6.

TABLE 6

| Example No. | Exemplified pigment | $V_0$ (−V) | $E_{\frac{1}{2}}$ (lux · sec) |
|---|---|---|---|
| 38 | 1-(1) | 700 | 2.8 |
| 39 | 2-(16) | 700 | 1.54 |

EXAMPLE 40 and 41

Subbing layers and charge-generating layers were formed on a support respectively in the same manner as in Example 2 or 11. Thereon, a solution of 5 g of 2,4,7-trinitro-9-fluorenone and 5 g of poly-4,4'-dioxydiphenyl-2,2-propane carbonate (weight-average molecular weight: 300,000) in 50 g of tetrahydrofuran was applied with a Meyer bar and dried to give a charge-transporting layer respectively of 18 μm thick and 20 μm thick.

The resulting electrophotographic photosensitive member was evaluated for the charging characteristics in the same manner as in Example 1 but employing a positive charge potential. The results are shown in Table 7.

TABLE 7

| Example No. | Exemplified pigment | $V_0$ (−V) | $E_{\frac{1}{2}}$ (lux · sec) |
|---|---|---|---|
| 40 | 1-(2) | 670 | 3.9 |
| 41 | 2-(1) | 670 | 3.11 |

EXAMPLE 42 AND 43

0.5 g of Exemplified pigment 1-(1) was dispersed in 10 g of cyclohexanone by means of a paint shaker for 5 hours. Thereto, a solution of 5 g of the charge-transporting substance and 5 g of the polycarbonate resin in 40 g of tetrahydrofuran as used in Example 1 was added, and the mixture was shaken further for one hour. The coating solution prepared thus was applied onto an aluminum substrate with a Meyer bar and was dried to form a photosensitive layer 18 μm thick, thereby an electrophotographic photosensitive member being prepared.

Another electrophotographic sensitive member was prepared in the same manner as above except that Exemplified pigment 2-(16) was used in place of Exemplified pigment 1-(1), the amount of the cyclohexane was changed to 9.5 g, and the thickness of the photosensitive layer was made to be 22 μm.

The electrophotographic photosensitive member prepared thus was evaluated for charging characteristics in the same manner as in Example 1 but employing positive charge potentials.

The results are shown in Table 8.

TABLE 8

| Example No. | Exemplified pigment | $V_0$ (−V) | $E_{\frac{1}{2}}$ (lux · sec) |
|---|---|---|---|
| 42 | 1-(1) | 697 | 3.1 |
| 41 | 2-(16) | 685 | 1.72 |

What is claimed is:

1. An electrophotographic photosensitive member comprising an electroconductive support and a photosensitive layer formed thereon, the photosensitive layer containing a disazo pigment represented by the general formula (1) or (2) below:

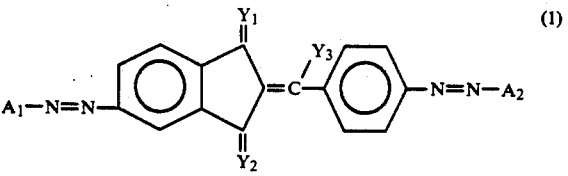

(1)

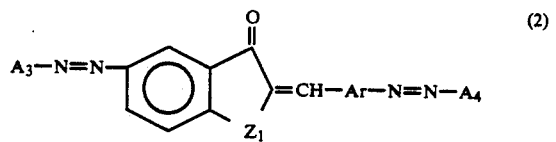

(2)

where $Y_1$ and $Y_2$ are independently an oxygen atom or a sulfur atom; $Y_3$ is a hydrogen atom, a substituted or unsubstituted alkyl group, or a cyano group; $Z_1$ is a group of methylene, sulfinyl, or sulfonyl; Ar is a substituted or unsubstituted arylene group or a substituted or unsubstituted bivalent heterocyclic group; $A_1$, $A_2$, $A_3$, and $A_4$ are independently a coupler residue having a phenolic hydroxyl group.

2. An electrophotographic photosensitive member according to claim 1, wherein the photosensitive layer contains the disazo pigment represented by the general formula (1) below:

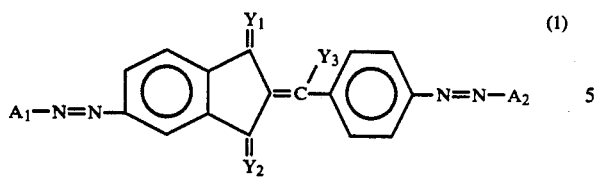
(1)

wherein $Y_1$ and $Y_2$ are independently an oxygen atom or a sulfur atom; $Y_3$ is a hydrogen atom, a substituted or unsubstituted alkyl group, or a cyano group; $A_1$ and $A_2$ are independently a coupler residue having a phenolic hydroxyl group.

3. An electrophotographic photosensitive member according to claim 1, wherein the photosensitive layer contains the disazo pigment represented by the general formula (2) below:

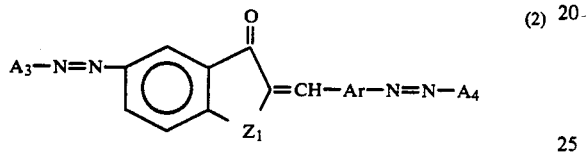
(2)

wherein $Z_1$ is a group of methylene, sulfinyl, or sulfonyl; Ar is a substituted or unsubstituted arylene group or a substituted or unsubstituted bivalent heterocyclic group; $A_3$ and $A_4$ are independently a coupler residue having a phenolic hydroxyl group.

4. An electrophotographic photosensitive member according to claim 1, wherein $A_1$, $A_2$, $A_3$, and $A_4$ each are selected from the groups represented by the formulas (3) to (8) below:

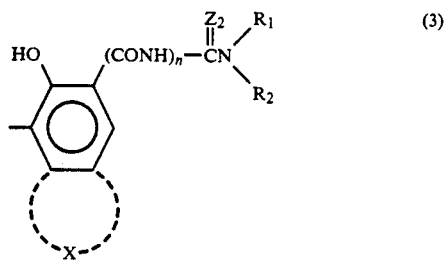
(3)

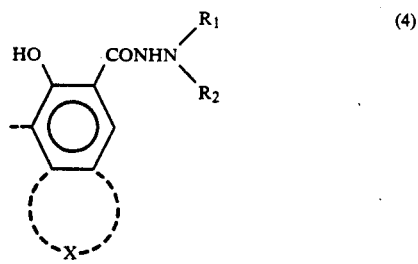
(4)

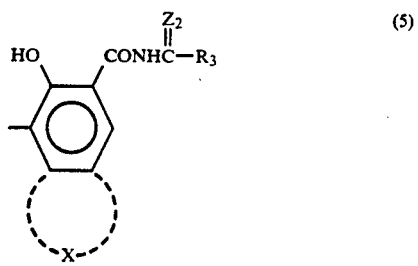
(5)

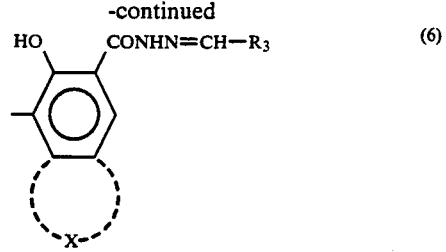
(6)

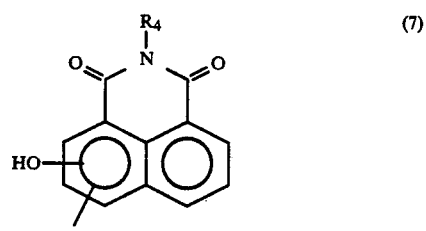
(7)

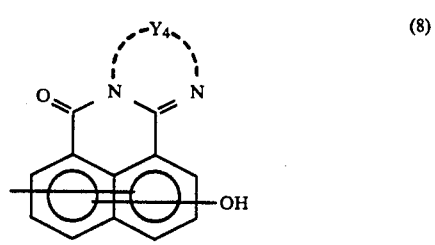
(8)

where X is an atomic group which forms, by condensation with the benzene ring, a polycyclic aromatic or heterocyclic ring; $Z_2$ is an oxygen atom or a sulfur atom; $R_1$ and $R_2$ are independently a hydrogen atom, a substituted or unsubstituted alkyl group, a substituted or unsubstituted aryl group, a substituted or unsubstituted aralkyl group, or a substituted or unsubstituted heterocyclic group, or $R_1$ and $R_2$ may be linked together to form a cyclic amine having a nitrogen atom in the ring; $R_3$ and $R_4$ are independently a hydrogen atom, a substituted or unsubstituted alkyl group, a substituted or unsubstituted aryl group, a substituted or unsubstituted aralkyl group, or a substituted or unsubstituted heterocyclic group; $Y_4$ is a substituted or unsubstituted bivalent aromatic hydrocarbon radical, or a substituted or unsubstituted bivalent heterocyclic radical having a nitrogen atom in the ring; and n is 0 or 1.

5. An electrophotographic photosensitive member according to claim 4, wherein the groups $A_1$ to $A_4$ are selected from the groups represented by the formulas (3), (4), (5), and (6).

6. An electrophotographic photosensitive member according to claim 4, wherein X is an atomic group for forming a benzocarbazole ring by condensing with the benzene ring in the formula.

7. An electrophotographic photosensitive member according to claim 4, wherein the groups $A_1$ to $A_4$ are selected from the groups represented by the formulas (3), (4), (5), and (6), and X is an atomic group for forming a benzocarbazole ring by condensing with the benzene ring in the formula.

8. An electrophotographic photosensitive member according to claim 1, wherein the photosensitive layer contains the compound of the formula (1) or the formula (2) as a charge-generating substance.

9. An electrophotographic photosensitive member according to claim 1, wherein the photosensitive layer comprises a charge-generating layer and a charge-transporting layer.

10. An electrophotographic photosensitive member according to claim 9, wherein the electrophotographic photosensitive member has an electroconductive support, a charge-generating layer formed thereon, and a charge-transporting layer formed further thereon.

11. An electrophotographic photosensitive member according to claim 9, wherein the electrophotographic photosensitive member has an electroconductive support, a charge-transporting layer formed thereon, and a charge-generating layer formed further thereon.

12. An electrophotographic photosensitive member according to claim 1, wherein the photosensitive layer is constituted of a single layer.

13. An electrophotographic photosensitive member according to claim 1, wherein the electrophotographic photosensitive member has a subbing layer between the electrophotographic support and the photosensitive layer.

14. An electrophotographic photosensitive member according to claim 1, wherein the electrophotographic photosensitive member has a protecting layer formed on the photosensitive layer.

15. An electrophotographic apparatus, comprising an electrophotographic photosensitive member, a means for forming an electrostatic latent image, a means for developing the electrostatic latent image formed, and a means for transferring a developed image onto a transfer-receiving material; said electrophotographic photosensitive member comprising an electroconductive support and a photosensitive layer formed thereon, wherein the photosensitive layer contains a disazo pigment represented by the general formula (1) or (2) below:

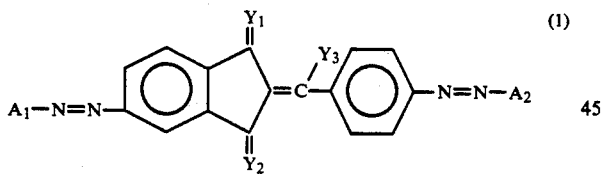
(1)

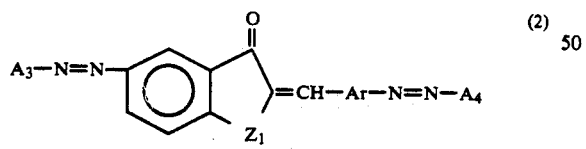
(2)

where $Y_1$ and $Y_2$ are independently an oxygen atom or a sulfur atom; $Y_3$ is a hydrogen atom, a substituted or unsubstituted alkyl group, or a cyano group; $Z_1$ is a group of methylene, sulfinyl, or sulfonyl; Ar is a substituted or unsubstituted arylene group or a substituted or unsubstituted bivalent heterocyclic group; $A_1$, $A_2$, $A_3$, and $A_4$ are independently a coupler residue having a phenolic hydroxyl group.

16. An electrophotographic apparatus according to claim 15, wherein $A_1$, $A_2$, $A_3$, and $A_4$ each are selected respectively from the groups represented by the formulas (3) to (8) below:

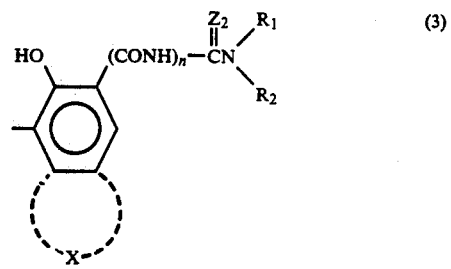
(3)

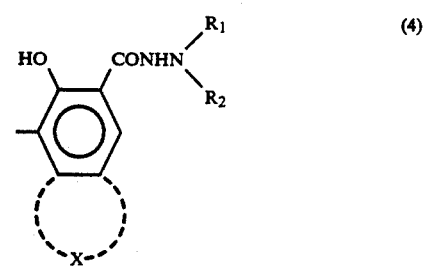
(4)

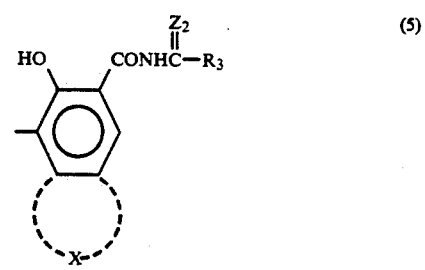
(5)

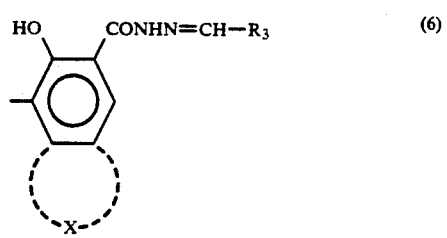
(6)

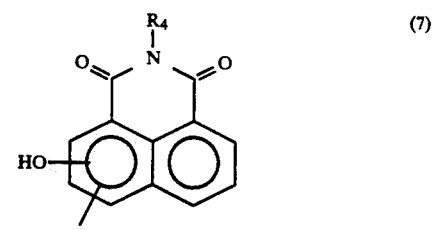
(7)

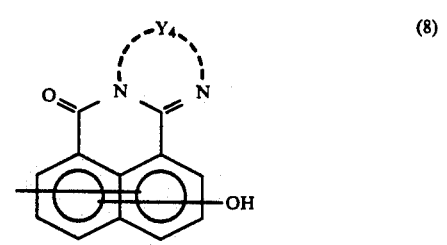
(8)

where X is an atomic group which forms, by condensing with the benzene ring, a polycyclic aromatic or heterocyclic ring; $Z_2$ is an oxygen atom or a sulfur atom; $R_1$ and $R_2$ are independently a hydrogen atom, a substituted or unsubstituted alkyl group, a substituted or unsubstituted aryl group, a substituted or unsubstituted aralkyl group, or a substituted or unsubstituted heterocyclic group, or $R_1$ and $R_2$ may be linked together to form a cyclic amine having a nitrogen atom in the ring; $R_3$ and $R_4$ are independently a hydrogen atom, a substituted or unsubstituted alkyl group, a substituted or unsubstituted aryl group, a substituted or unsubstituted aralkyl group, or a substituted or unsubstituted heterocyclic group; $Y_4$ is a substituted or unsubstituted bivalent aromatic hydrocarbon radical, or a substituted or unsubstituted bivalent heterocyclic radical having a nitrogen atom in the ring; and n is 0 or 1.

17. A device unit comprising an electrophotographic photosensitive member, a charging means, and a cleaning means; said electrophotographic photosensitive member comprising an electroconductive support and a photosensitive layer formed thereon, wherein the photosensitive layer contains a disazo pigment represented by the general formula (1) or (2) below:

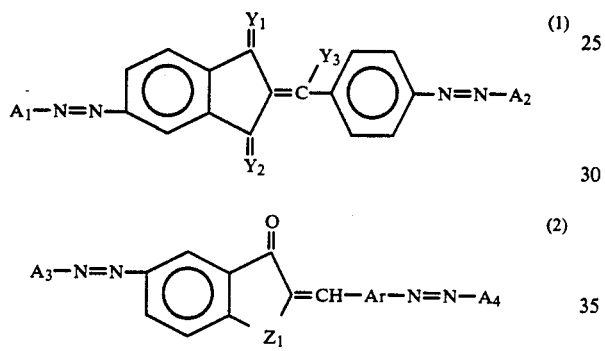

where $Y_1$ and $Y_2$ are independently an oxygen atom or a sulfur atom; $Y_3$ is a hydrogen atom, a substituted or unsubstituted alkyl group, or a cyano group; $Z_1$ is a group of methylene, sulfinyl, or sulfonyl; Ar is a substituted or unsubstituted arylene group or a substituted or unsubstituted bivalent heterocyclic group; $A_1$, $A_2$, $A_3$, and $A_4$ are independently a coupler residue having a phenolic hydroxyl group; and the unit holds the electrophotographic photosensitive member, the charging means, and the cleaning means integrally, and is demountable from the main body of an electrophotographic apparatus.

18. A device unit according to claim 17, wherein $A_1$, $A_2$, $A_3$, and $A_4$ each are selected from the groups represented by the formulas (3) to (8) below:

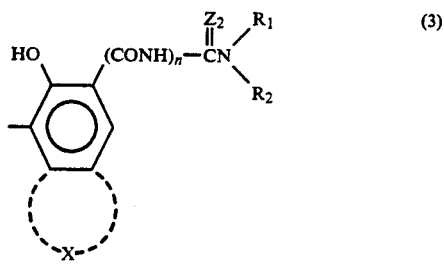

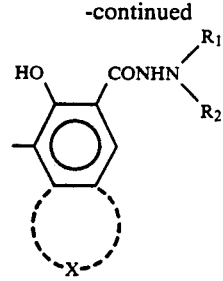

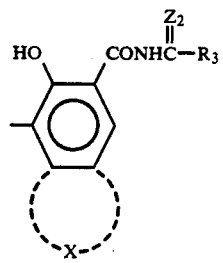

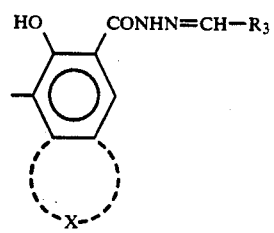

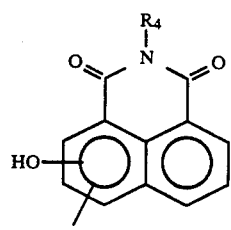

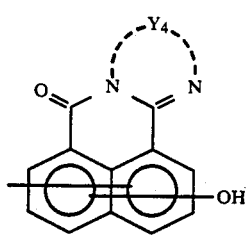

wherein X is an atomic group which forms, by condensation with the benzene ring, a polycyclic aromatic or heterocyclic ring; $Z_2$ is an oxygen atom or a sulfure atom; $R_1$ and $R_2$ are independently a hydrogen atom, a substituted or unsubstituted alkyl group, a substituted or unsubstituted aryl group, a substituted or unsubstituted aralkyl group, or a substituted or unsubstituted heterocyclic group, or $R_1$ and $R_2$ may be linked together to form a cyclic amine having a nitrogen atom in the ring; $R_3$ and $R_4$ are independently a hydrogen atom, a substituted or unsubstituted alkyl group, a substituted or unsubstituted aryl group, a substituted or unsubstituted aralkyl group, or a substituted or unsubstituted heterocyclic group; $Y_4$ is a substituted or unsubstituted bivalent aromatic hydrocarbon radical, or a substituted or unsubstituted bivalent heterocyclic radical having a nitrogen atom in the ring; and n is 0 or 1.

19. A device unit according to claim 17, wherein the unit comprises a developing means.

20. A facsimile machine, comprising an electrophotographic apparatus and a signal-receiving means for receiving image information from a remote terminal: said electrophotographic apparatus comprising an electrophotographic photosensitive member, said electrophotographic photosensitive member comprising an electroconductive support and a photosensitive layer formed thereon, wherein the photosensitive layer contains a disazo pigment represented by the general formula (1) or (2) below:

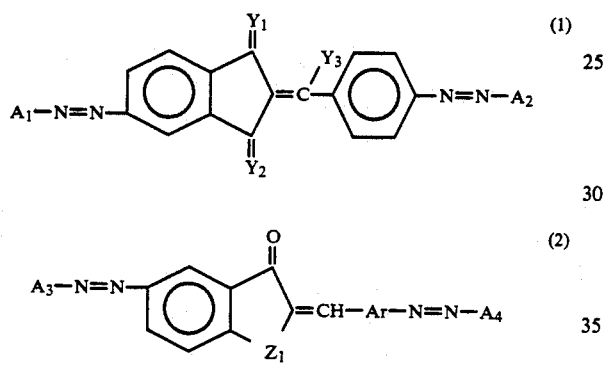

wherein $Y_1$ and $Y_2$ are independently an oxygen atom or a sulfur atom; $Y_3$ is a hydrogen atom, a substituted or unsubstituted alkyl group, or a cyano group; $Z_1$ is a group of methylene, sulfinyl, or sulfonyl; Ar is a substituted or unsubstituted arylene group or a substituted or unsubstituted bivalent heterocyclic group; $A_1$, $A_2$, $A_3$, and $A_4$ are independently a coupler residue having a phenolic hydroxyl group.

21. A facsimile machine according to claim 20, wherein $A_1$, $A_2$, $A_3$, and $A_4$ are selected respectively from the groups represented by the formulas (3) to (8) below:

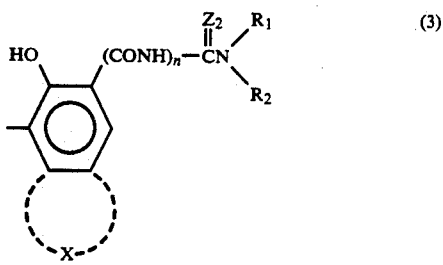

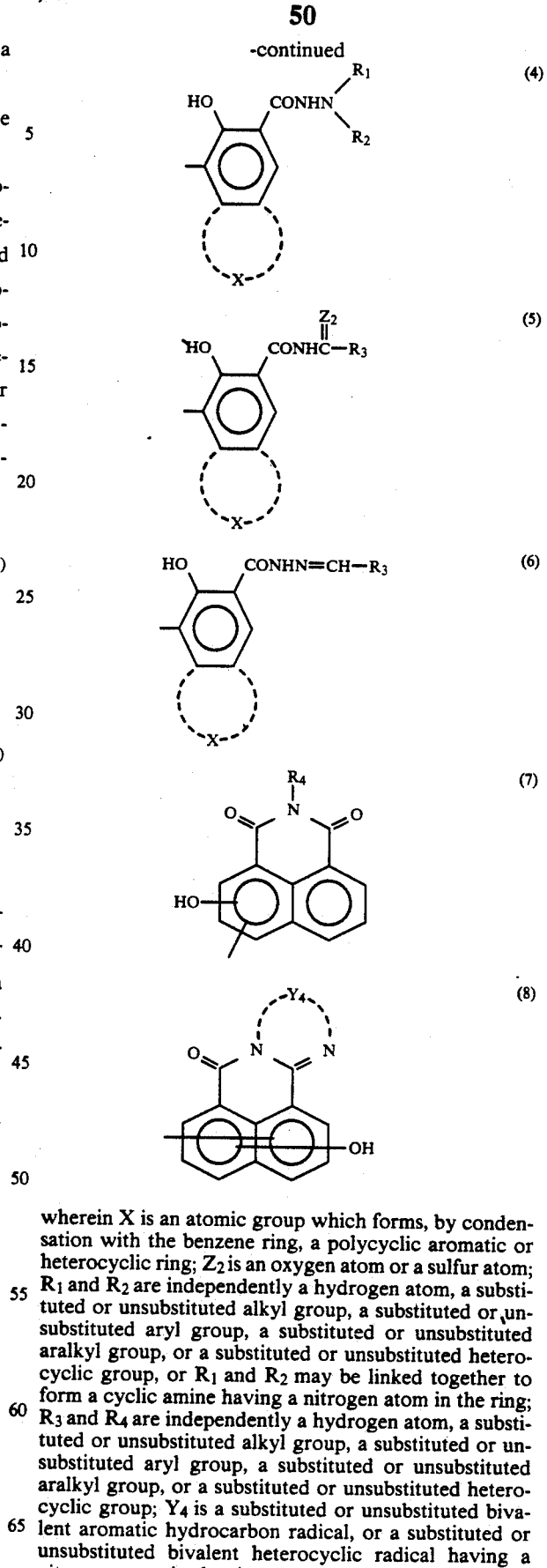

wherein X is an atomic group which forms, by condensation with the benzene ring, a polycyclic aromatic or heterocyclic ring; $Z_2$ is an oxygen atom or a sulfur atom; $R_1$ and $R_2$ are independently a hydrogen atom, a substituted or unsubstituted alkyl group, a substituted or unsubstituted aryl group, a substituted or unsubstituted aralkyl group, or a substituted or unsubstituted heterocyclic group, or $R_1$ and $R_2$ may be linked together to form a cyclic amine having a nitrogen atom in the ring; $R_3$ and $R_4$ are independently a hydrogen atom, a substituted or unsubstituted alkyl group, a substituted or unsubstituted aryl group, a substituted or unsubstituted aralkyl group, or a substituted or unsubstituted heterocyclic group; $Y_4$ is a substituted or unsubstituted bivalent aromatic hydrocarbon radical, or a substituted or unsubstituted bivalent heterocyclic radical having a nitrogen atom in the ring; and n is 0 or 1.

* * * * *

UNITED STATES PATENT AND TRADEMARK OFFICE
CERTIFICATE OF CORRECTION

PATENT NO. : 5,278,013
DATED : January 11, 1994
INVENTOR(S) : YOSHIO KASHIZAKI, ET AL.

It is certified that error appears in the above-identified patent and that said Letters Patent is hereby corrected as shown below:

<u>COLUMN 48</u>

Line 55, "sulfure" should read --sulfur--.

Signed and Sealed this

Fifth Day of July, 1994

BRUCE LEHMAN

Attest:

Attesting Officer      Commissioner of Patents and Trademarks